United States Patent
Yin

(10) Patent No.: US 11,105,349 B2
(45) Date of Patent: *Aug. 31, 2021

(54) HYDROKINETIC TORQUE-COUPLING DEVICE HAVING LOCK UP CLUTCH WITH DUAL PISTON ASSEMBLY

(71) Applicant: Valeo Kapec Co., Ltd., Daegu (KR)

(72) Inventor: Xuexian Yin, Troy, MI (US)

(73) Assignee: Valeo Kapec Co., Ltd., Daegu (KR)

(*) Notice: Subject to any disclaimer, the term of this patent is extended or adjusted under 35 U.S.C. 154(b) by 187 days.

This patent is subject to a terminal disclaimer.

(21) Appl. No.: 16/506,755

(22) Filed: Jul. 9, 2019

(65) Prior Publication Data
US 2021/0010493 A1 Jan. 14, 2021

(51) Int. Cl.
*F16H 45/02* (2006.01)
*F15B 15/14* (2006.01)
(Continued)

(52) U.S. Cl.
CPC ........ *F15B 15/1447* (2013.01); *F15B 15/149* (2013.01); *F15B 15/204* (2013.01);
(Continued)

(58) Field of Classification Search
CPC ............. F16H 45/02; F16H 2045/0205; F16H 2045/0215; F16H 2045/0221; F16H 61/14; F16H 61/142
See application file for complete search history.

(56) References Cited

U.S. PATENT DOCUMENTS

| | | | |
|---|---|---|---|
| 3,235,043 A * | 2/1966 | Jean Maurice | F16H 45/00 192/3.25 |
| 3,747,436 A * | 7/1973 | Hause | F16H 47/08 475/69 |

(Continued)

FOREIGN PATENT DOCUMENTS

| | | |
|---|---|---|
| JP | 2017110724 A | 6/2017 |
| JP | 2017210971 A | 11/2017 |
| KR | 101785936 B1 | 10/2017 |

OTHER PUBLICATIONS

International Search Report and Written Opinion dated Oct. 23, 2020 from corresponding application PCT/KR2020/009005.
(Continued)

*Primary Examiner* — Charles A Fox
*Assistant Examiner* — Ryan P Dodd
(74) *Attorney, Agent, or Firm* — Berenato & White, LLC

(57) ABSTRACT

A hydrokinetic torque-coupling device for a hybrid electric vehicle, comprising a casing rotatable about a rotational axis, a torque converter including an impeller wheel and a turbine wheel, a lockup clutch including a dual piston assembly, and a selective clutch disposed outside of the casing. The selective clutch includes an input member and an output member non-rotatably mounted to the casing. The dual piston assembly includes a main piston and a secondary piston adjacent to the main piston and axially moveable relative thereto. The main and secondary pistons are coaxial with the rotational axis. The main piston is selectively axially moveable relative to the casing and the secondary piston between a lockup position and a non-lockup position. The output member is selectively axially moveable relative to the input member between an engaged position and a disengaged position. The output member selectively is axially moveable by action of secondary piston.

20 Claims, 33 Drawing Sheets

(51) Int. Cl.
 *F15B 15/26* (2006.01)
 *F16H 61/14* (2006.01)
 *F15B 15/20* (2006.01)

(52) U.S. Cl.
 CPC ............ *F15B 15/26* (2013.01); *F16H 45/02* (2013.01); *F16H 61/14* (2013.01); *F16H 2045/0205* (2013.01)

(56) References Cited

U.S. PATENT DOCUMENTS

| | | | | |
|---|---|---|---|---|
| 4,311,067 | A | * | 1/1982 | Froumajou ............. F16H 3/089 |
| | | | | 477/57 |
| 4,860,861 | A | * | 8/1989 | Gooch .................... F16H 45/02 |
| | | | | 192/3.26 |
| 5,695,028 | A | * | 12/1997 | Fukushima ............. F16H 45/00 |
| | | | | 192/3.27 |
| 9,200,685 | B2 | * | 12/2015 | Ushio ..................... F16H 45/02 |
| 10,808,822 | B1 | * | 10/2020 | Yin ....................... F16D 41/086 |
| 10,895,312 | B2 | * | 1/2021 | Yin ..................... F16D 25/0635 |
| 2008/0169165 | A1 | | 7/2008 | Samie et al. |
| 2009/0139818 | A1 | | 6/2009 | Ishikawa et al. |
| 2015/0323018 | A1 | | 11/2015 | Hemphill et al. |
| 2017/0326965 | A1 | | 11/2017 | Lahr et al. |
| 2018/0178778 | A1 | | 6/2018 | Lahr et al. |

OTHER PUBLICATIONS

Yin, Xuexian, U.S. Appl. No. 16/284,918, filed Feb. 25, 2019 in the name of Valeo Kapec Co., Ltd.

\* cited by examiner

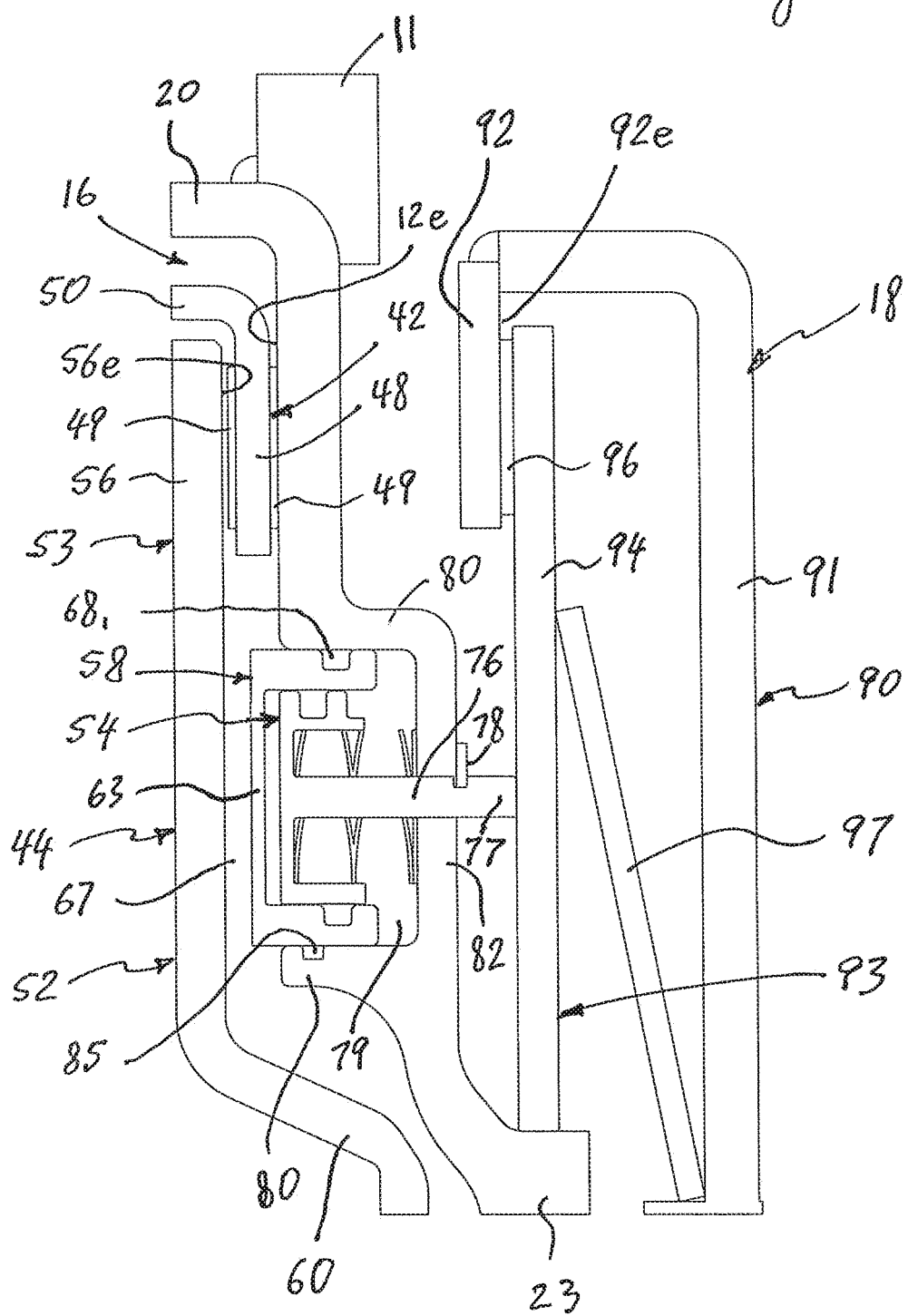

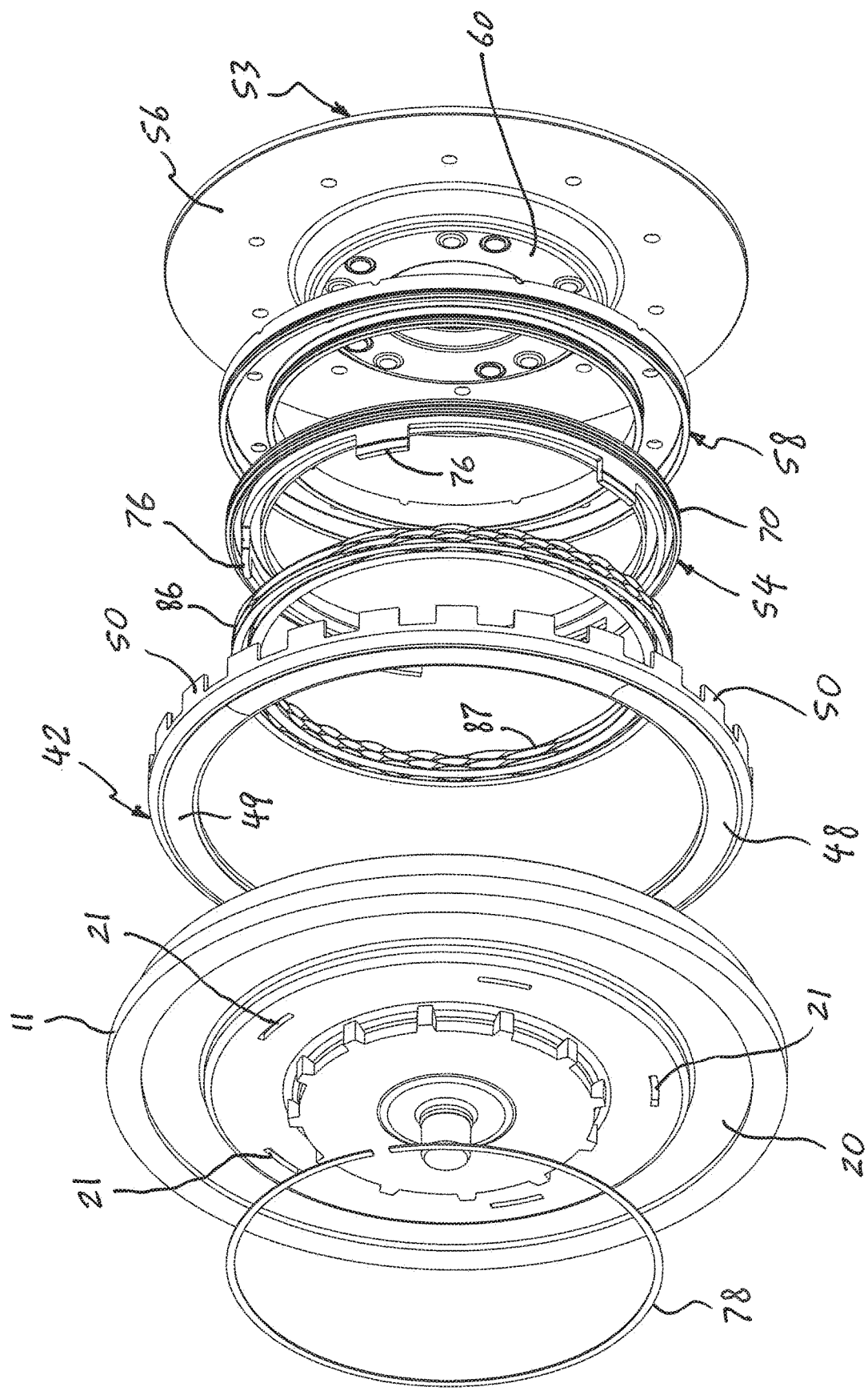

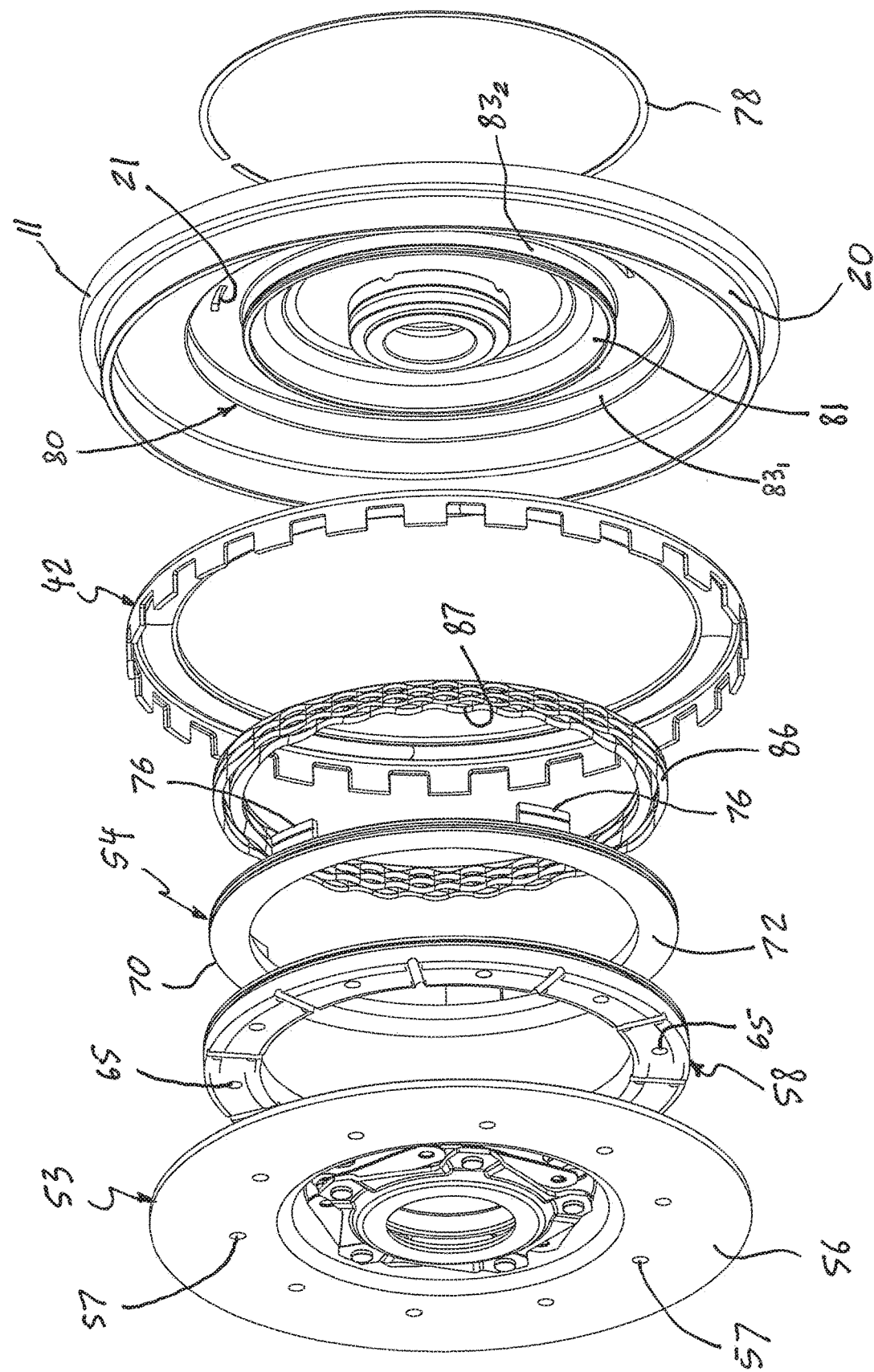

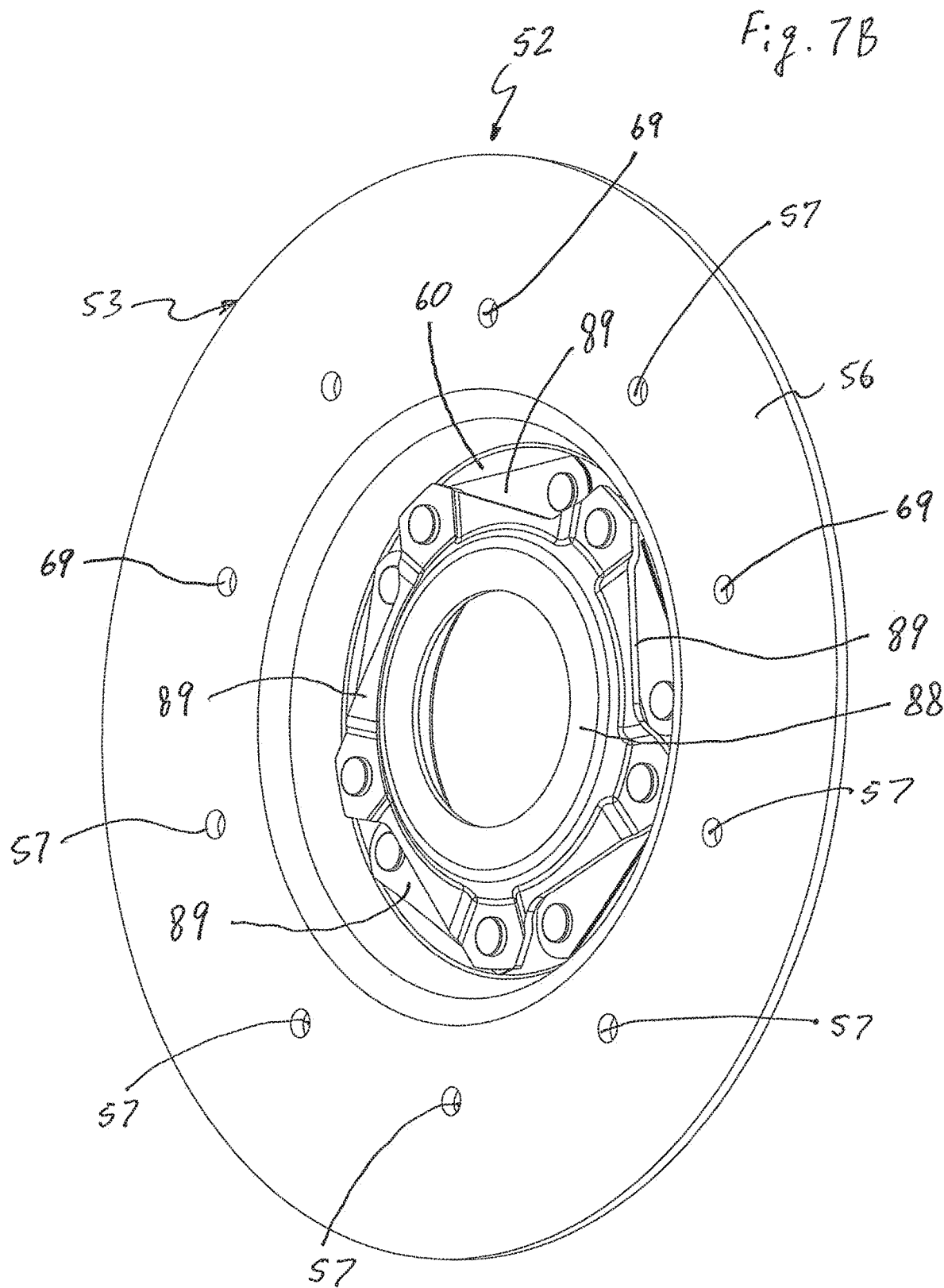

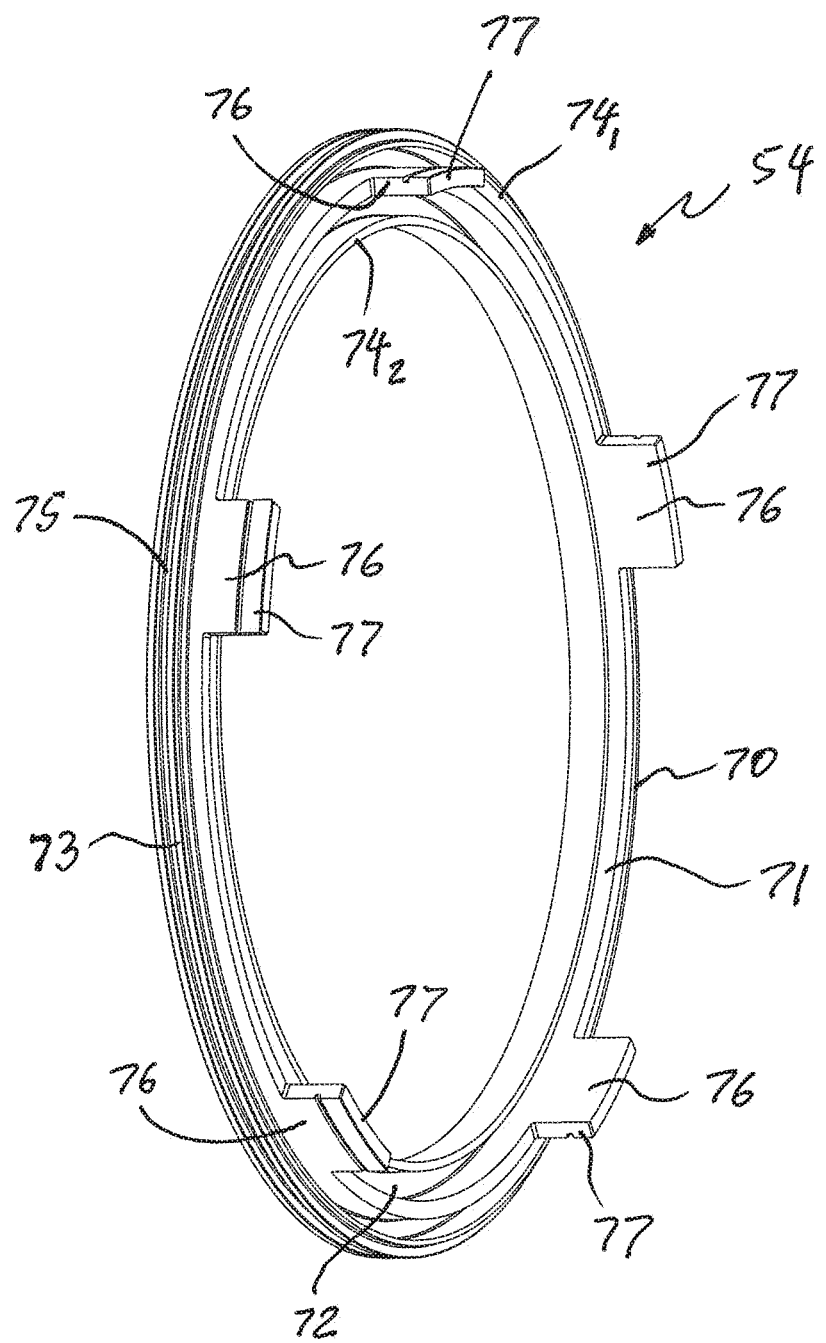

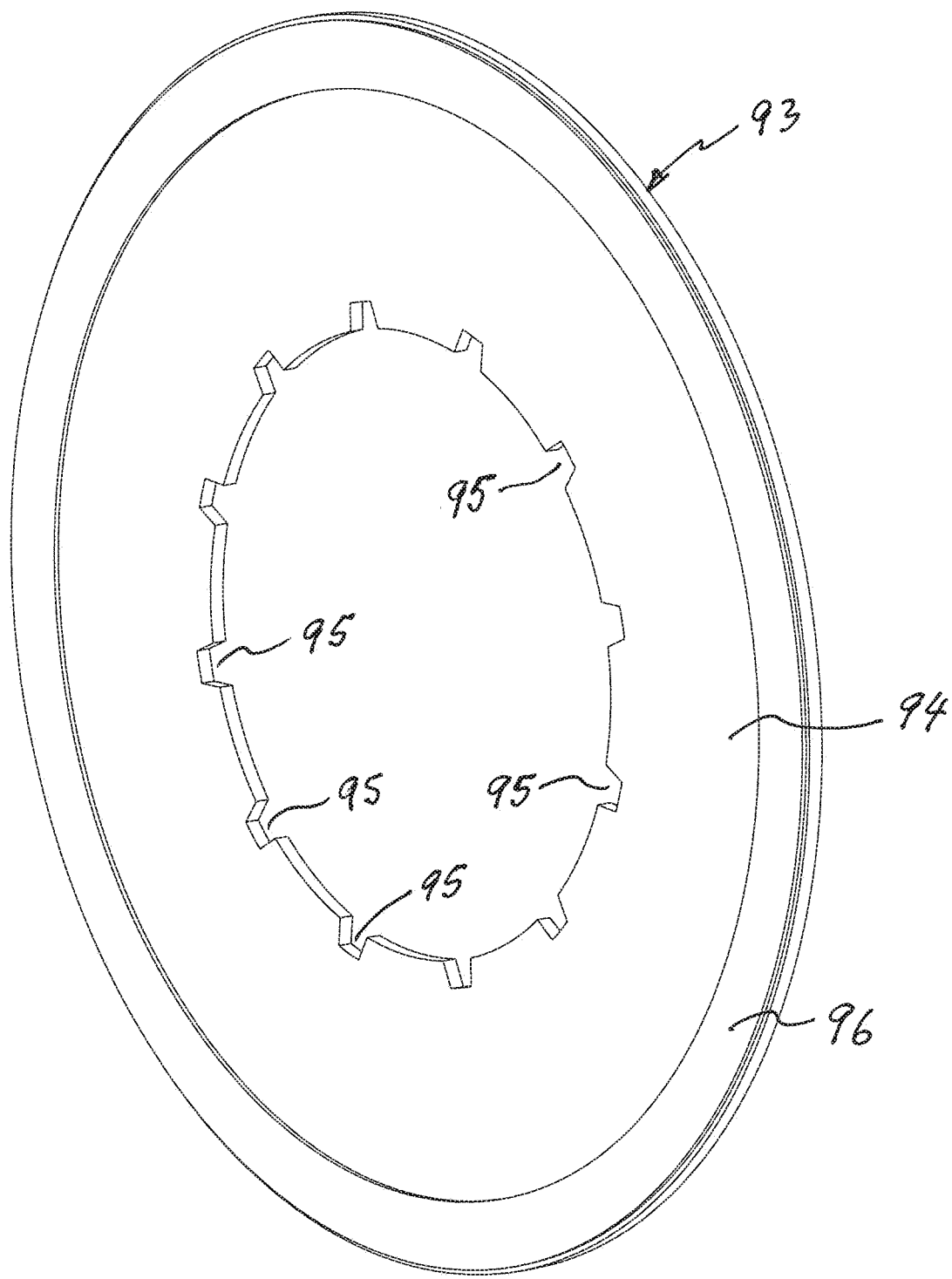

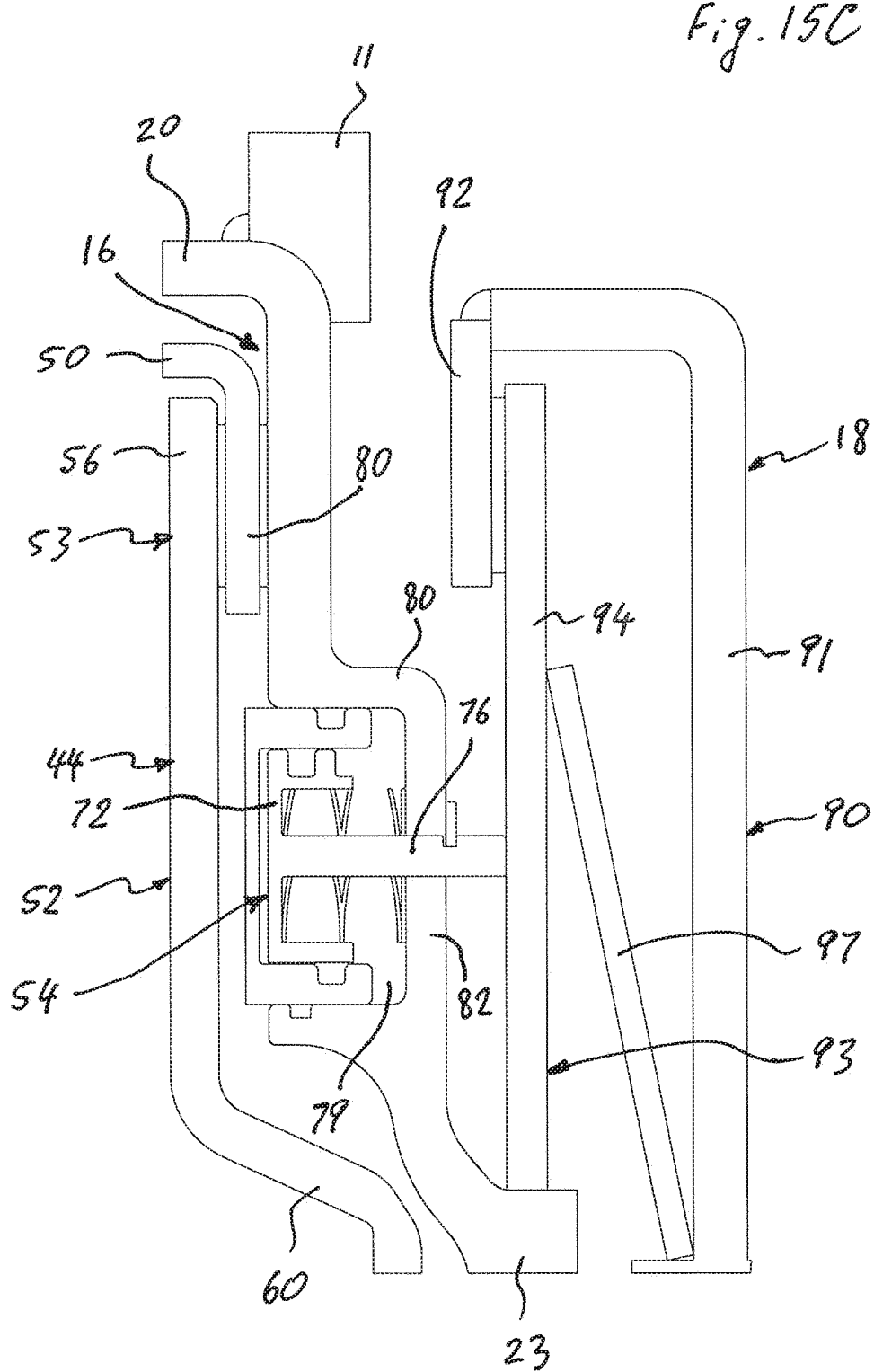

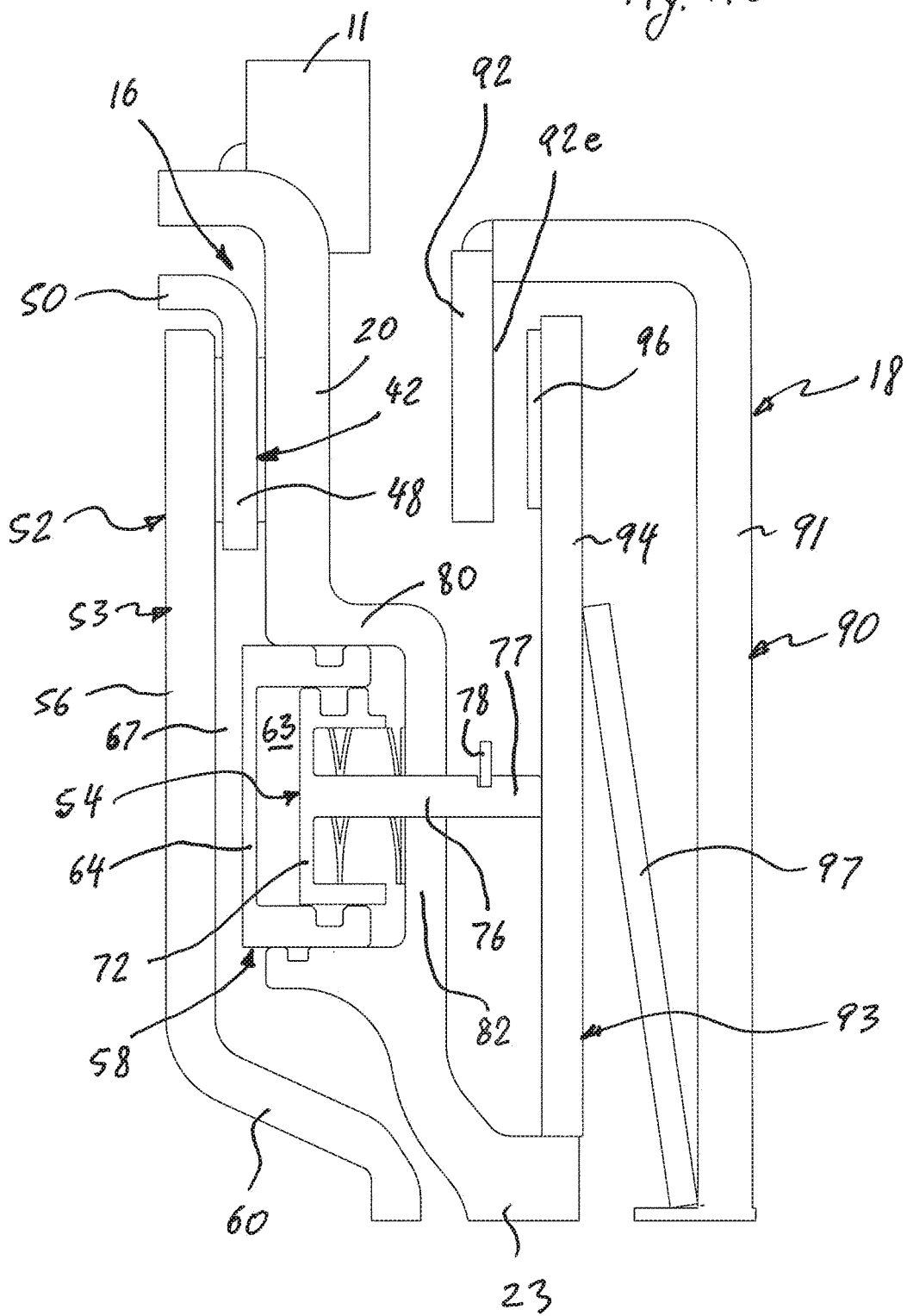

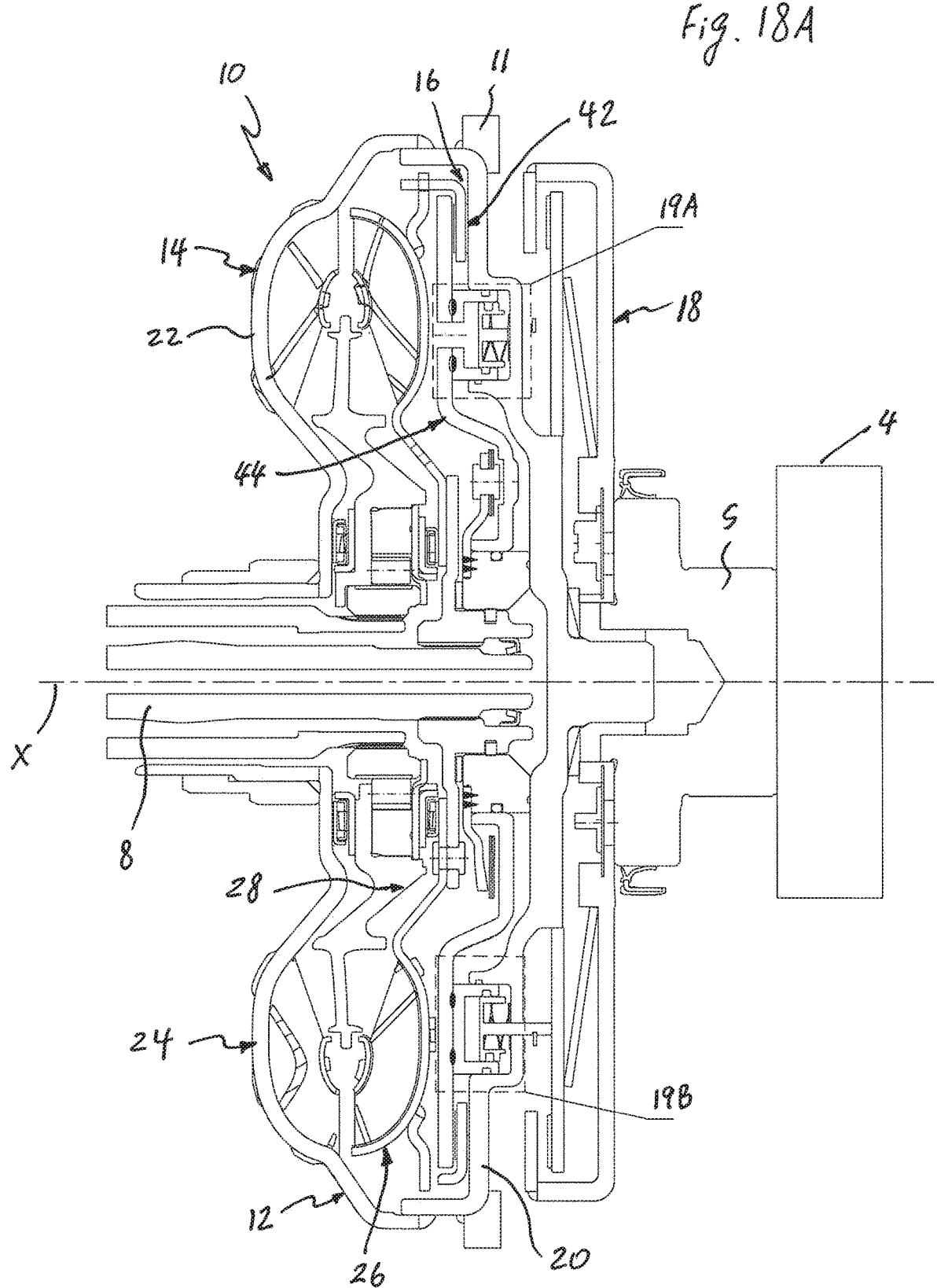

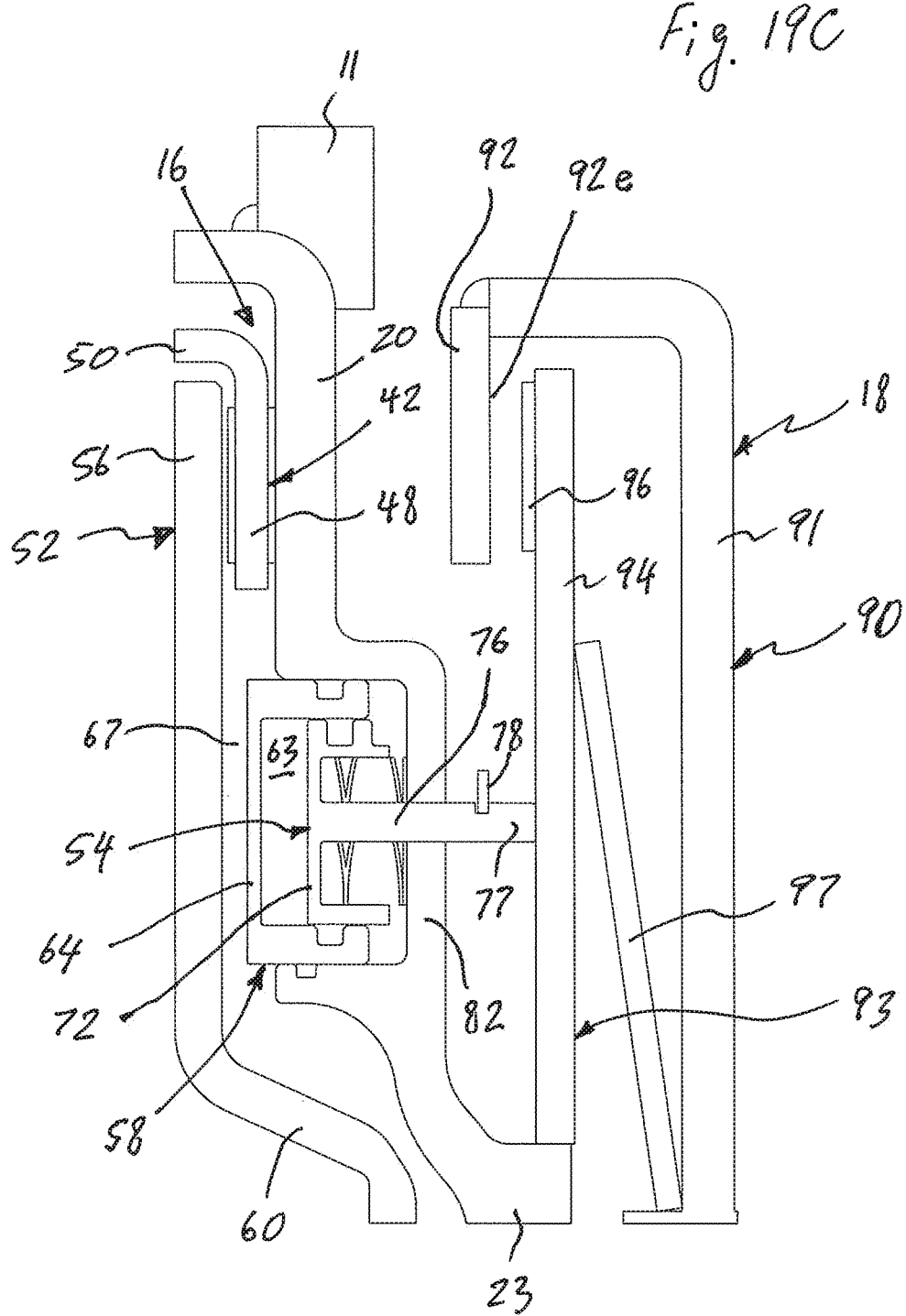

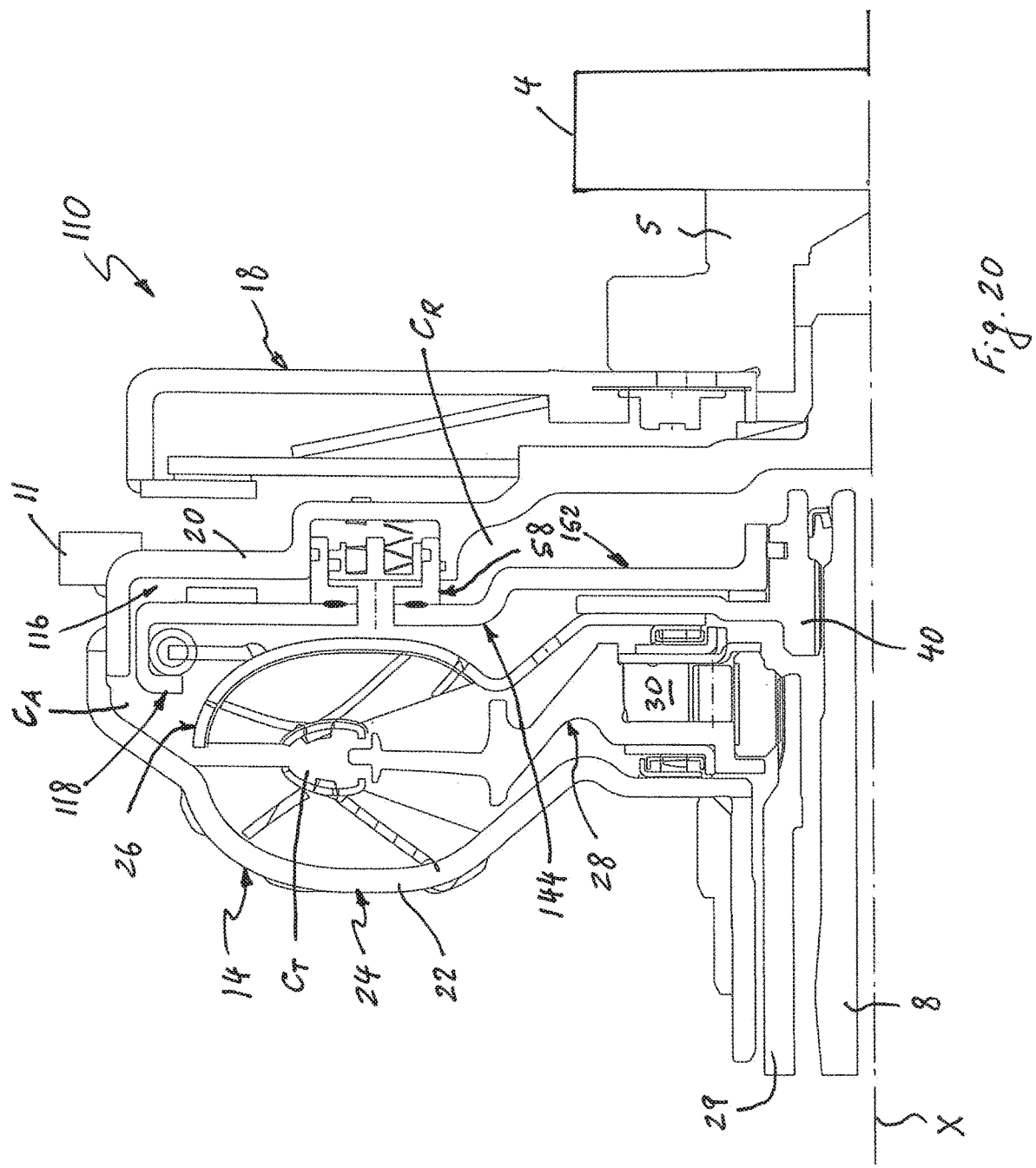

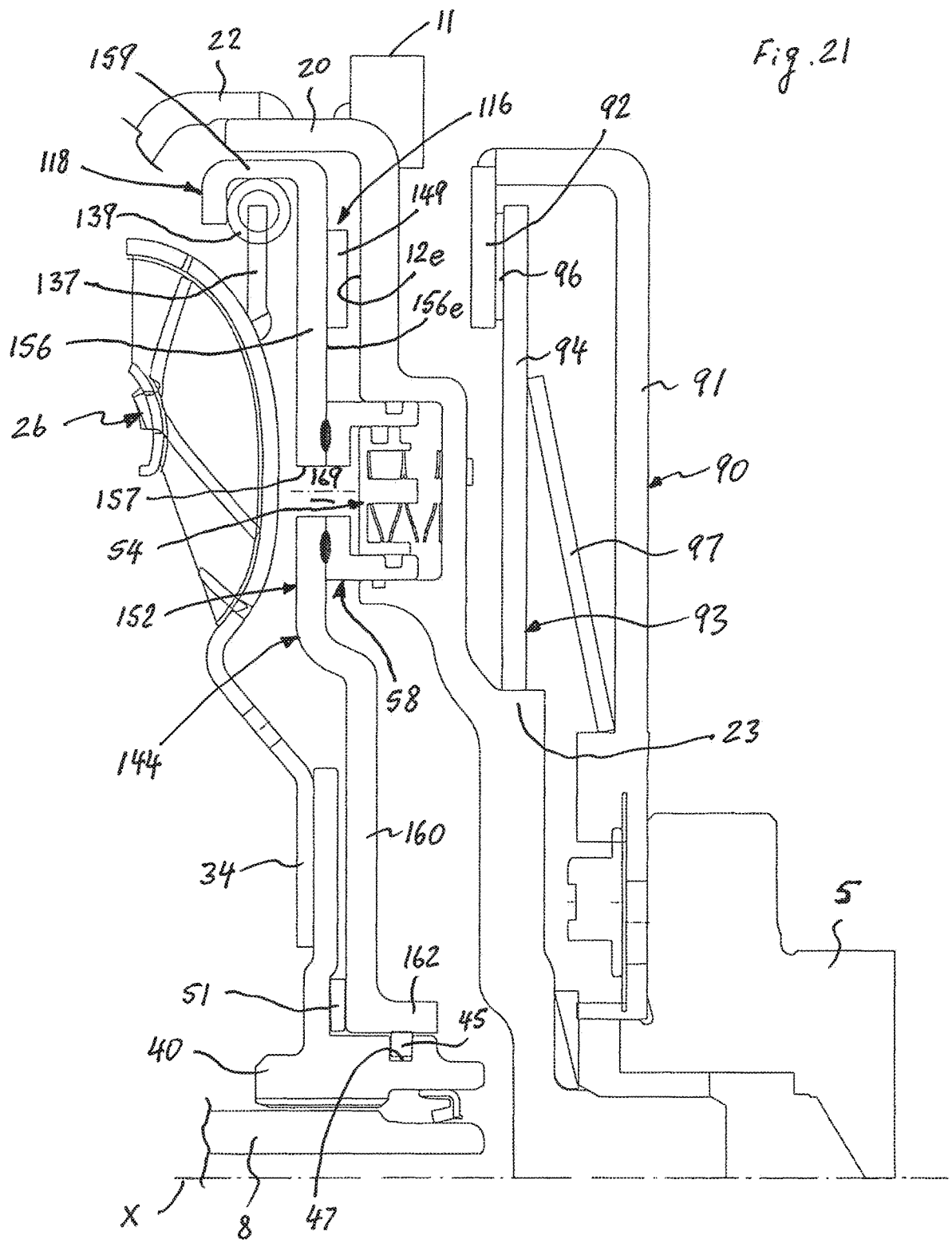

HYDROKINETIC TORQUE-COUPLING DEVICE HAVING LOCK UP CLUTCH WITH DUAL PISTON ASSEMBLY

FIELD OF THE INVENTION

This invention generally relates to fluid coupling devices, and more particularly to a hydrokinetic torque-coupling device for a vehicle hybrid powertrain system having a lock-up clutch with a dual piston structure, and a method of making and using the same.

BACKGROUND OF THE INVENTION

Known hybrid powertrain systems include an internal combustion engine and an electric motor/generator that are coupled to a vehicle transmission to transfer torque to a driveline for tractive effort. Known electric motor/generators are supplied electric power from energy storage systems, such as electric batteries. Hybrid powertrain systems may operate in various modes to generate and transfer propulsion power to vehicle wheels.

For example, U.S. patent application Ser. No. 16/284,918 filed on Feb. 25, 2019, which is incorporated herein by reference in its entirety, discloses a hybrid powertrain system including an internal combustion engine and an electric motor/generator that are coupled to a vehicle transmission to transfer torque to a driveline for tractive effort. The hybrid powertrain system of the above-referenced prior art application includes a lockup clutch including a dual piston assembly. The dual piston assembly includes a main piston and a plurality of individual secondary pistons with piston rods. However, the individual secondary piston rods of U.S. patent application Ser. No. 16/284,918 may be difficult to align. Also, the plurality of individual secondary pistons increases manufacturing cost and complexity of structure of the dual piston assembly of the prior art. Moreover, centrifugal force of the plurality of individual secondary pistons may exert high hysteresis during their axial reciprocating strokes.

Thus, while existing hybrid powertrain systems, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque-coupling device for a hybrid electric vehicle. The hydrokinetic torque-coupling device includes a casing rotatable about a rotational axis and forming a cavity filled with a hydraulic fluid, a torque converter including an impeller wheel and a turbine wheel disposed in the casing coaxially with the impeller wheel, a lockup clutch including a dual piston assembly and being switchable between a hydrodynamic transmission mode and a lockup mode, and a selective clutch disposed outside of the casing. The selective clutch includes an input member rotatable relative to the casing and an output member non-rotatably mounted to the casing. The dual piston assembly includes a main piston axially moveable relative to the casing and a secondary piston adjacent to the main piston and axially moveable relative to the main piston and the casing. Both the main piston and the secondary piston of the dual piston assembly are coaxial with the rotational axis. The main piston comprises a main piston body and an actuator casing non-movable relative to the to the main piston body. Both the main piston body and the actuator casing are coaxial with the rotational axis. The actuator casing forms a secondary piston cylinder coaxial with the rotational axis and configured to reciprocatingly receive the secondary piston therewithin. The main piston has at least one axial communication channel fluidly connecting the secondary piston cylinder of the actuator casing of the main piston with the cavity within the casing. The main piston of the dual piston assembly is selectively axially moveable relative to the casing and the secondary piston between a lockup position and a non-lockup position. The output member of the selective clutch is selectively axially moveable relative to the input member between an engaged position, in which the output member is non-rotatably coupled to the input member of the selective clutch, and a disengaged position, in which the output member is rotatable relative to the input member of the selective clutch. The output member of the selective clutch is selectively axially moveable from the engaged position to the disengaged position of the selective clutch by action of the secondary piston.

According to a second aspect of the present invention, there is provided a method of operation of a hydrokinetic torque-coupling device for a hybrid electric vehicle comprising an internal combustion engine and an electrical machine. The hydrokinetic torque-coupling device includes a casing rotatable about a rotational axis and forming a cavity filled with a hydraulic fluid, a torque converter including an impeller wheel and a turbine wheel disposed in the casing coaxially with the impeller wheel, a lockup clutch including a dual piston assembly and being switchable between a hydrodynamic transmission mode and a lockup mode, and a selective clutch disposed outside of the casing. The selective clutch includes an input member rotatable relative to the casing and an output member non-rotatably mounted to the casing. The dual piston assembly includes a main piston axially moveable relative to the casing and a secondary piston adjacent to the main piston and axially moveable relative to the main piston and the casing. Both the main piston and the secondary piston of the dual piston assembly are coaxial with the rotational axis. The main piston comprises a main piston body and an actuator casing non-movable relative to the to the main piston body. Both the main piston body and the actuator casing are coaxial with the rotational axis. The actuator casing forms a secondary piston cylinder coaxial with the rotational axis and configured to reciprocatingly receive the secondary piston therewithin. The main piston has at least one axial communication channel fluidly connecting the secondary piston cylinder of the actuator casing of the main piston with the cavity within the casing. The main piston of the dual piston assembly is selectively axially moveable relative to the casing and the secondary piston between a lockup position and a non-lockup position. The output member of the selective clutch is selectively axially moveable relative to the input member between an engaged position, in which the output member is non-rotatably coupled to the input member of the selective clutch, and a disengaged position, in which the output member is rotatable relative to the input member of the selective clutch. The output member of the selective clutch is selectively axially moveable from the engaged position to the disengaged position of the selective clutch by action of the secondary piston. The method includes the step of selectively controlling axial displacement of the dual lockup piston assembly by regulating hydraulic pressure to the main piston and the secondary piston in order to configure the output member of the selective clutch in a desired one of the engaged position and the disengaged position.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

FIG. 4C is an enlarged view of a fragment of the hydrokinetic torque-coupling device shown in the rectangle "4C" of FIG. 3B;

FIG. 6A is an exploded perspective view from the rear of the lock-up clutch with a dual piston assembly and a cover shell in accordance with the first exemplary embodiment of the present invention;

FIG. 6B is an exploded perspective view from the front of the lock-up clutch with the dual piston assembly and the cover shell in accordance with the first exemplary embodiment of the present invention;

FIG. 7B is a perspective view from the front of the main piston of the dual piston assembly in accordance with the first exemplary embodiment of the present invention;

FIG. 9 is a perspective view from the rear of a secondary piston of the dual piston assembly in accordance with the first exemplary embodiment of the present invention;

FIG. 12 is a perspective view of an output member of the selective clutch in accordance with the first exemplary embodiment of the present invention;

FIG. 15C is an enlarged view of a fragment of the hydrokinetic torque-coupling device of FIG. 14B;

FIG. 17C is an enlarged view of a fragment of the hydrokinetic torque-coupling device of FIG. 16B;

FIG. 18A is a first sectional view of the hydrokinetic torque-coupling device in accordance with the first exemplary embodiment of the present invention in a fourth mode of operation;

FIG. 19C is an enlarged view of a fragment of the hydrokinetic torque-coupling device of FIG. 18B;

FIG. 20 is a sectional view of a hydrokinetic torque-coupling device in accordance with a second exemplary embodiment of the present invention in a first mode of operation; and FIG. 21 is an enlarged view of a fragment of the hydrokinetic torque-coupling device of FIG. 20 partially showing a lock-up clutch and a selective clutch.

Figure 1:
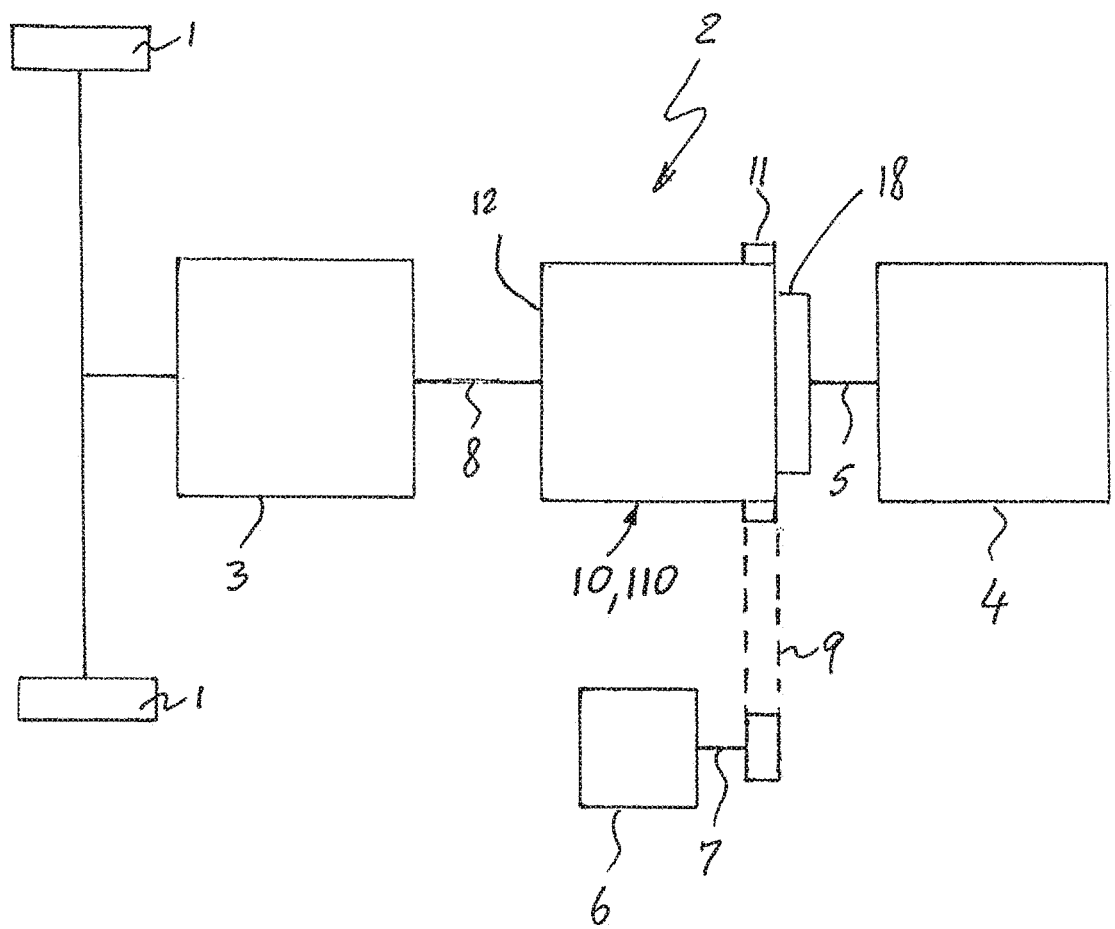
FIG. 1 is a schematic view of a hybrid powertrain system in accordance with the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the words "a" and "an" as used in the claims means "at least one" and the word "two" as used in the claims means "at least two". For the purpose of clarity, some technical material that is known in the related art has not been described in detail in order to avoid unnecessarily obscuring the disclosure.

FIG. 1 shows a schematic view of a hybrid powertrain system 2 of a hybrid motor vehicle in accordance with the present invention. The hybrid powertrain system 2 comprises multiple torque-generating devices, including an internal combustion engine (ICE) 4 and at least one rotary electric machine (such as motor, generator or motor/generator) 6. The ICE 4 and the electric machine 6 are mechanically coupled via a hydrokinetic torque-coupling device 10 and a transmission 3 to transfer propulsion power to vehicle wheels 1. The hydrokinetic torque-coupling device 10 of the present invention may be employed in any suitable powertrain configuration that includes the ICE 4 and the electric machine 6 coupled via the hydrokinetic torque-coupling device 10 and the transmission 3. The hybrid powertrain system 2 may be employed in vehicles including, but not limited to, passenger vehicles, light-duty or heavy-duty trucks, utility vehicles, agricultural vehicles, industrial/warehouse vehicles, recreational off-road vehicles, etc.

The hybrid powertrain system 2 is configured so that the ICE 4 and the electric machine 6 are mechanically coupled to the transmission 3 through the hydrokinetic torque-coupling device 10.

Figure 2:
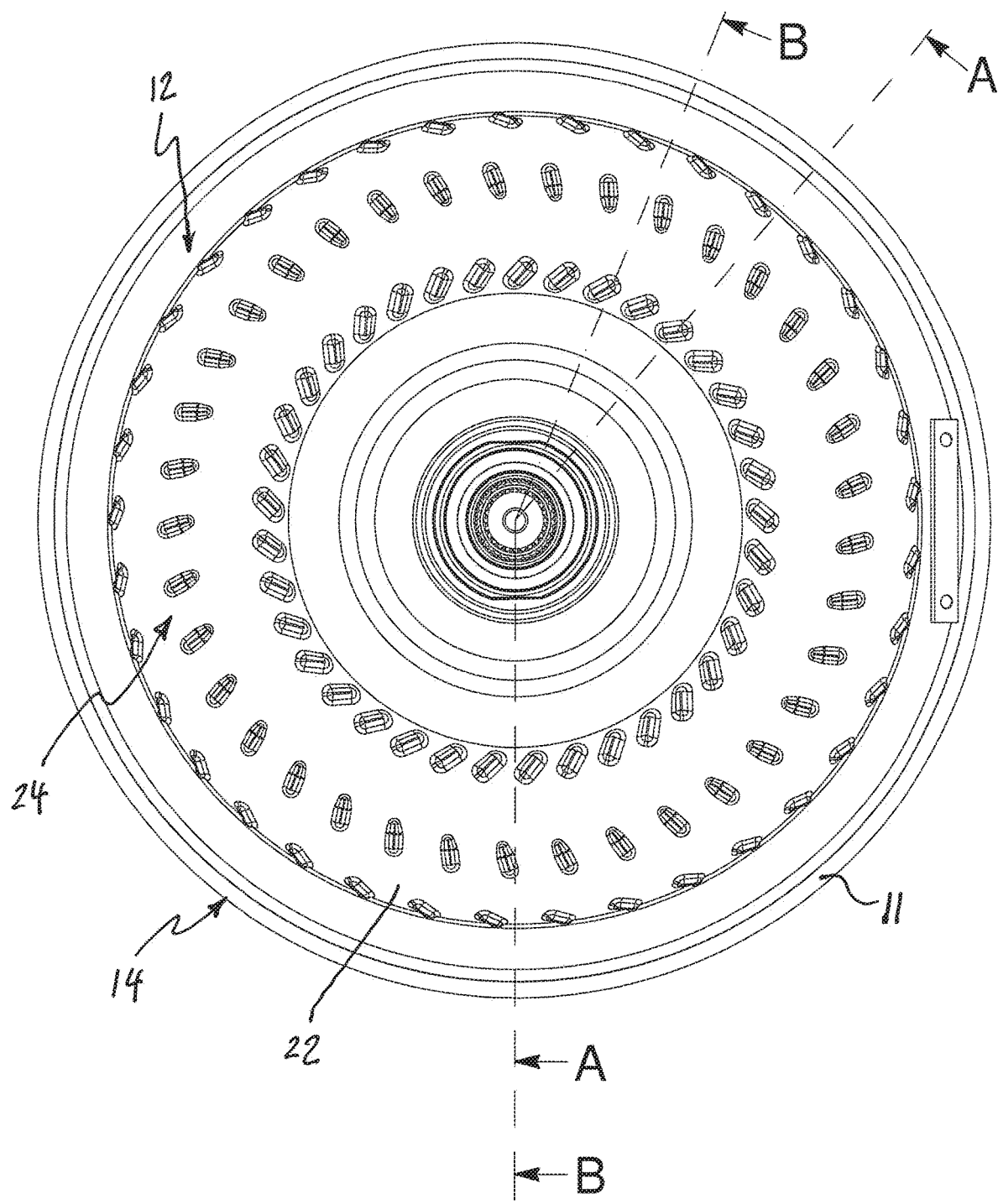
FIG. 2 is a front view of a hydrokinetic torque-coupling device in accordance with a first exemplary embodiment of the present invention in a first mode of operation.
Figure 3A:
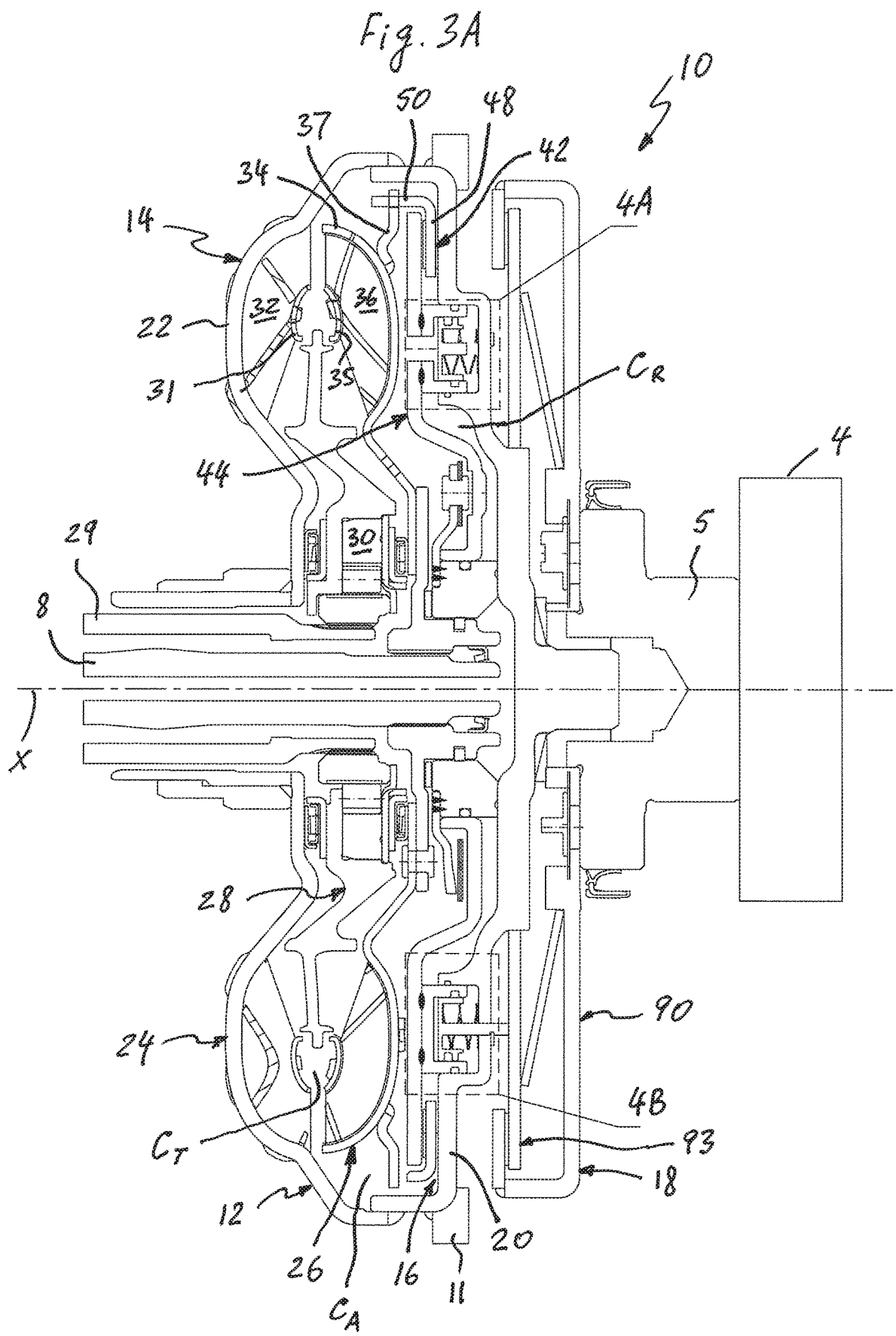
FIG. 3A is a first sectional view of the hydrokinetic torque-coupling device in accordance with the first exemplary embodiment of the present invention in a first mode of operation taken along the line A-A in FIG. 2.
Figure 3B:
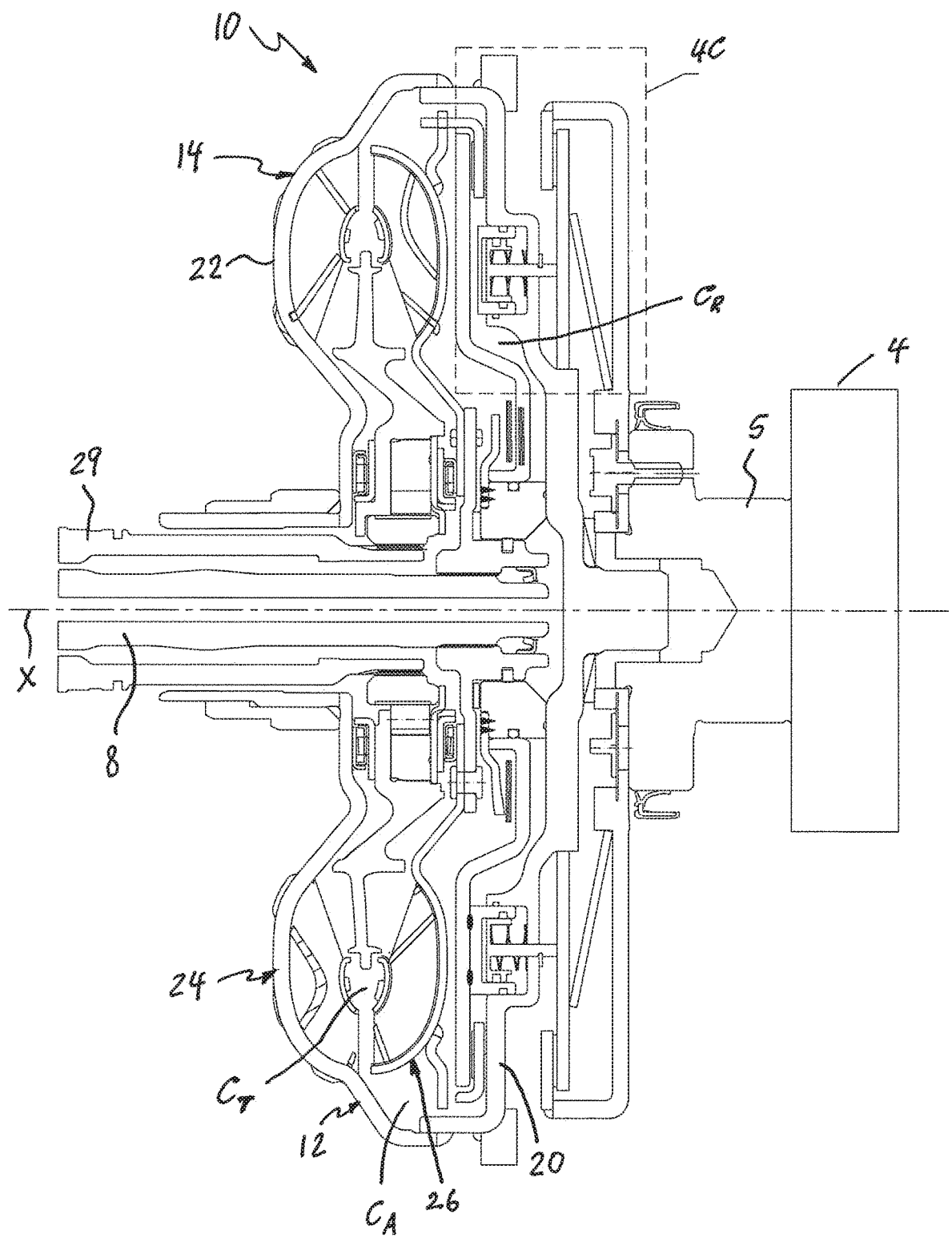
FIG. 3B is a second sectional view of the hydrokinetic torque-coupling device in accordance with the first exemplary embodiment of the present invention in the first mode of operation taken along the line B-B in FIG. 2.

The hydrokinetic torque-coupling device 10 in accordance with a first exemplary embodiment of the present invention is generally represented in the accompanying drawings by reference numeral 10, as best shown in FIGS. 2, 3A and 3B. The hydrokinetic torque-coupling device 10 is intended to couple first and/or second driving shafts to a driven shaft, for example in the hybrid powertrain system 2 of the hybrid motor vehicle. In this case, the first driving shaft is an output shaft (such as a crankshaft) 5 of the ICE 4 of the hybrid motor vehicle, and the second driving shaft is an output shaft 7 of the rotary electric machine 6, as best shown in FIG. 1. The driven shaft is an input shaft 8 of a transmission (or gearbox) 3 of the hybrid motor vehicle, as shown in FIGS. 1, 3A and 3B. Thus, the hydrokinetic torque-coupling device 10 is able to selectively couple the ICE 4 of the hybrid motor vehicle and/or the rotary electric machine 6 to the driven shaft 8.

The hydrokinetic torque-coupling device 10 includes a sealed hollow casing 12 forming a cavity filled with a hydraulic fluid, such as oil or transmission fluid, and rotatable about a rotational axis X, a hydrokinetic torque converter 14, a lock-up clutch 16, and a selective clutch 18. Hereinafter the axial and radial orientations are considered with respect to the rotational axis X of the torque-coupling device 10. As best shown in FIGS. 3A and 3B, the lock-up clutch 16 is disposed in the casing 12, while the selective clutch 18 is disposed outside of the casing 12.

The sealed casing 12, the torque converter 14, the lock-up clutch 16 and the selective clutch 18 are all rotatable about the rotational axis X. As is known in the art, the torque-coupling device 10 is symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the first exemplary embodiment, as illustrated in FIGS. 3A and 3B, includes a first shell (or cover shell) 20, and a second shell (or impeller shell) 22 disposed coaxially with and axially opposite to the first shell 20. The first and second shells 20, 22 are non-movably (i.e., fixedly) interconnected and sealed together about their outer peripheries, such as by weld 13. Each of the first and second shells 20, 22 are preferably integral or one-piece and may be made, for example, by press-forming one-piece metal sheets.

The first shell 20 is selectively drivingly connectable to the driving shaft, typically to the output shaft 5 of the ICE 4 through the selective clutch 18. Specifically, in the illustrated embodiment of FIGS. 3A and 3B, the casing 12 is selectively rotatably driven by the ICE 4 and is selectively drivingly coupled to the driving shaft 5 through the selective clutch 18.

Furthermore, the cover shell 20 is drivingly (non-rotatably) connected to the output shaft 7 of the rotary electric machine 6 through a sprocket (or a ring gear) 11, which is non-movably (i.e., fixedly) connected to the cover shell 20 (such as by welding or other appropriate means), and a continuous belt 9 (or a pinion gear), so that the casing 12 turns at the same speed at which the rotary electric machine 6 operates for transmitting torque.

The torque converter 14 includes an impeller wheel (sometimes referred to as the pump, impeller assembly or impeller) 24, a turbine wheel (sometimes referred to as the turbine assembly or turbine) 26, and a stator (sometimes referred to as the reactor) 28 interposed axially between the impeller wheel 24 and the turbine wheel 26. The impeller wheel 24, the turbine wheel 26, and the stator 28 are coaxially aligned with one another and the rotational axis X. The impeller wheel 24, the turbine wheel 26, and the stator 28 collectively form a torus. The impeller wheel 24 and the turbine wheel 26 may be fluidly coupled to one another in operation as known in the art. In other words, the turbine wheel 26 is hydro-dynamically drivable by the impeller wheel 24.

The impeller wheel 24 includes the impeller shell 22, an annular impeller core ring 31, and a plurality of impeller blades 32 fixedly (i.e., non-moveably) attached, such as by brazing, to the impeller shell 22 and to the impeller core ring 31. The impeller shell 22 is preferably an integral (or unitary) component, e.g., made of a single part or separate components fixedly connected together.

The turbine wheel 26, as best shown in FIGS. 3A and 3B, includes an annular, semi-toroidal (or concave) turbine shell 34 rotatable about the rotational axis X, an annular turbine core ring 35, and a plurality of turbine blades 36 fixedly (i.e., non-moveably) attached, such as by brazing, to the turbine shell 34 and the turbine core ring 35. The turbine shell 34, the turbine core ring 35 and the turbine blades 36 are conventionally formed by stamping from steel blanks. The impeller shell 22 and the turbine shell 34 collectively define a toroidal inner chamber (or torus chamber) CT therebetween.

The stator 28 is positioned between the impeller wheel 24 and the turbine wheel 26 to redirect fluid from the turbine wheel 26 back to the impeller wheel 24 in an efficient manner. The stator 28 is typically mounted on a one-way (or overrunning) clutch 30 to prevent the stator 28 from counter-rotating.

The turbine wheel 26 is non-moveably secured to a turbine (or output) hub 40 by appropriate means, such as by rivets, threaded fasteners or welding. The turbine hub 40 is non-rotatably connected to the driven shaft 8, such as through splines. The turbine hub 40 is rotatable about the rotational axis X and is coaxial with the driven shaft 8 so as to center the turbine wheel 26 on the driven shaft 8. An annular sealing member 43, mounted to a radially inner peripheral surface of the output hub 40, creates a seal at the interface of the transmission input shaft 8 and the output hub 40. Conventionally, the turbine blades 36 of the turbine wheel 26 interact, in a known manner, with the impeller blades 32 of the impeller wheel 24. The stator 28 is coupled in rotation to a stationary stator shaft 29 through the one-way (or overrunning) clutch 30.

At low turbine shaft speeds, the impeller wheel 24 causes hydraulic fluid to flow from the impeller wheel 24 to the turbine wheel 26, and to flow back to the impeller wheel 24 through the stator 28, thereby providing a first power flow path. The stator 28 is held against rotation by the one-way clutch 30 so that it can redirect the fluid flow and provide a reaction torque for torque multiplication. The one-way clutch 30 permits rotation of the stator 28 in one direction only. In other words, the stator 28 is typically mounted on the one-way clutch 30 to prevent the stator 28 from counter-rotation.

Figure 4B:
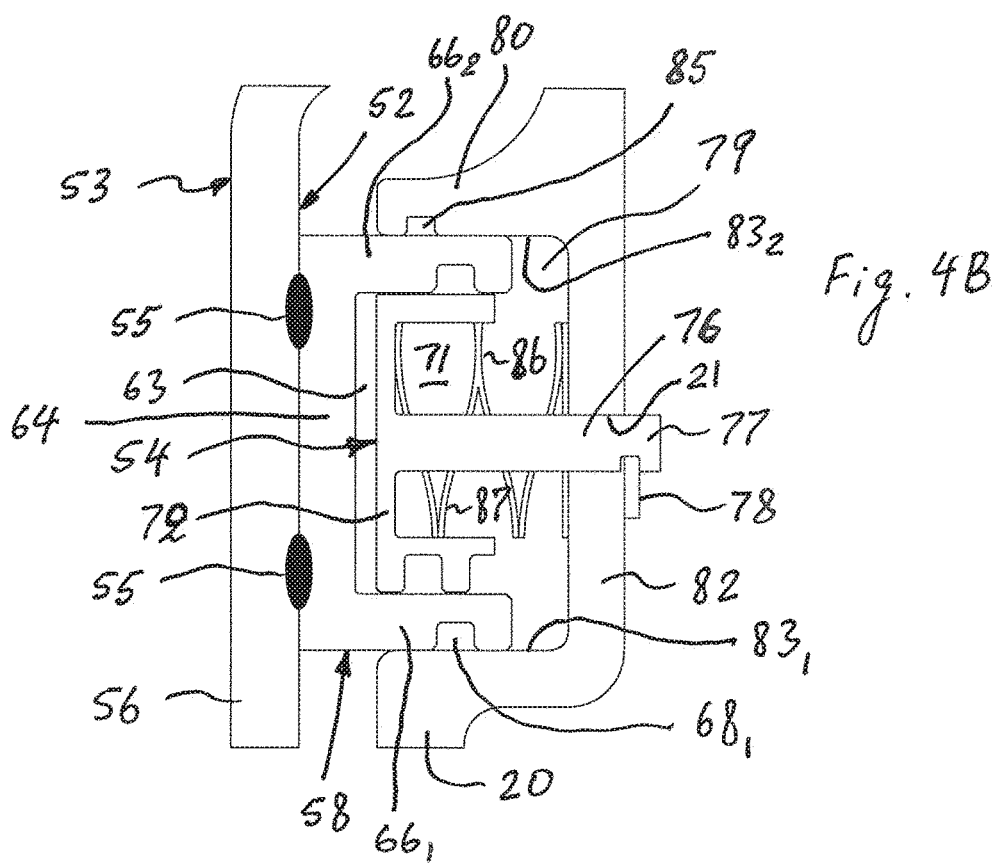
FIG. 4B is an enlarged view of a fragment of the hydrokinetic torque-coupling device shown in the rectangle "4B" of FIG. 3A.
Figure 5:
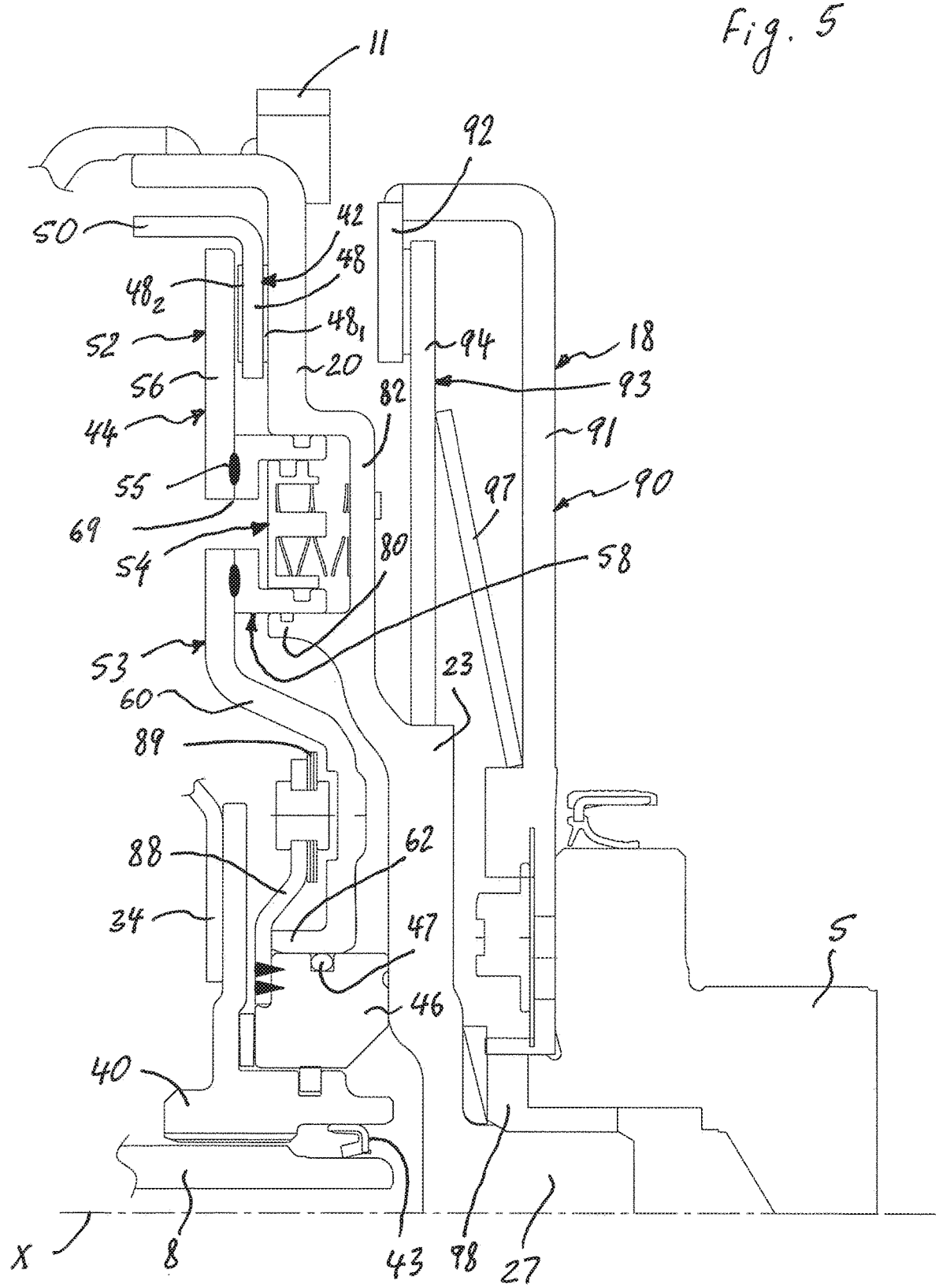
FIG. 5 is an enlarged view of a fragment of the hydrokinetic torque-coupling device of FIG. 3A partially showing a lock-up clutch and a selective clutch.

The lock-up clutch 16 is switchable between a hydrodynamic transmission mode, in which the turbine wheel 26 is rotatable relative to the casing 12, and a lockup mode, in which the turbine wheel 26 is non-rotatably coupled to the casing 12. The lock-up clutch 16 of the torque-coupling device 10 includes a friction ring 42, and a dual piston assembly 44, both axially movable to and from the cover shell 20. The friction ring 42 is axially moveable relative to the casing 12 along the rotational axis X to and from a locking (or inner engagement) surface 12e defined on the cover shell 20 of the casing 12, as best shown in FIGS. 4B and 5. The friction ring 42 is configured to selectively frictionally engage the locking surface 12e of the cover shell 20 of the casing 12. The friction ring 42 is disposed axially between the dual piston assembly 44 and the cover shell 20.

The dual piston assembly 44 is mounted to a cover hub 46 so as to be rotatable relative thereto. Moreover, the dual piston assembly 44 is axially moveable along the cover hub 46. The cover hub 46 is non-moveably attached to the cover shell 20 by appropriate means, such as by welding. In turn, the cover hub 46 is slidingly mounted to the turbine hub 40 so as to be rotatable relative to the turbine hub 40.

The friction ring 42 includes a generally radially orientated annular friction portion 48, as best shown in FIGS. 4B and 5, and one or more driving tabs (or abutment elements) 50 extending axially outwardly from the friction portion 48 of the friction ring 42 toward the turbine wheel 26. Moreover, the driving tabs 50 are equiangularly and equidistantly spaced from each other. The friction ring 42 with the friction portion 48 and the driving tabs 50 is preferably an integral (or unitary) part, e.g., made of a single or unitary component, but may be separate components fixedly connected together. Preferably, the driving tabs 50 are integrally press-formed on the friction ring 42. The friction ring 42 is drivingly engaged with the turbine wheel 26 through the driving tabs 50 and turbine tabs fixed to an outer surface of the turbine shell 34 by appropriate means, such as by welding. In other words, the driving tabs 50 drivingly engage the turbine tabs 37 so that the friction ring 42 is non-rotatably coupled to the turbine wheel 26 while being axially moveable along the rotational axis X relative to the turbine shell 34 so as to selectively engage the friction ring 42 against the locking surface 12e of the casing 12.

The annular friction portion 48 of the friction ring 42 has axially opposite first and second friction faces $48_1$ and $48_2$, respectively, as best shown in FIGS. 4B and 5. The first friction face $48_1$ of the friction ring 42 (defining an engagement surface of the friction ring 42) faces the locking surface 12e of the cover shell 20 of the casing 12. An annular friction liner 49 is attached to each of the first and second friction faces $48_1$ and $48_2$ of the annular friction portion 48 of the friction ring 42, such as by adhesive bonding, as best shown in FIGS. 4B, 5, 6A and 6B.

As best shown in FIGS. 4B and 5, the dual piston assembly 44 includes an annular main (or first) piston 52 axially movable to and from the cover shell 20, and an annular secondary (or second) piston 54 mounted to the main piston 52 coaxially therewith and axially moveable relative to the main piston 52. Moreover, the main piston 52 is rotatable relative to the secondary piston 54 and the cover shell 20. The friction portion 48 of the friction ring 42 is disposed axially between the main piston 52 and the locking surface 12e of the cover shell 20.

The lock-up clutch 16 is not limited to the dual sided lock-up clutch in the first exemplary embodiment. Because the secondary piston 54 is not fixed to the main piston 52, the secondary piston 54 can rotate at a different speed with respect to the main piston 52. Thus, any known lock-up clutch, such as single sided lock-up clutch and multi disc clutch, may be incorporated with this invention.

The sealed casing 12 and the dual piston assembly 44 collectively define a hydraulically sealed apply chamber $C_A$ between the impeller shell 22 and the dual piston assembly 44, and a hydraulically sealed release chamber $C_R$ between the cover shell 20, the dual piston assembly 44 and the cover hub 46. As known to those skilled in the art, hydrokinetic torque coupling devices typically include a fluid pump and a control mechanism controlling and regulating hydraulic pressure of the hydrokinetic torque coupling device. The control mechanism regulates the pressure in the apply chamber $C_A$ and in the release chamber $C_R$ (i.e., on the axially opposite sides of the main piston 52 of the lock-up clutch 16) through operation of a valve system to selectively position the main piston 52 in a desired position associated with an intended one of the operating modes.

The main piston 52 comprises an annular main piston body 53, and an annular actuator casing 58 coaxially fixedly attached to the annular main piston body 53. The annular actuator casing 58 is coaxially fixedly attached to the annular main piston body 53 by appropriate means, such as by spot welding shown at 55 in FIGS. 4A, 4B and 5. The main piston body 53 includes a radially oriented annular main piston plate 56 coaxial with the rotational axis X, and an annular hub portion 60 having a cylindrical flange 62 that is proximate the rotational axis X relative to the annular main piston plate 56 of the main piston body 53. The cylindrical flange 62 of the hub portion 60 of the main piston body 53 extends axially at a radially inner peripheral end of the hub portion 60 toward the turbine wheel 26.

Figure 7A:
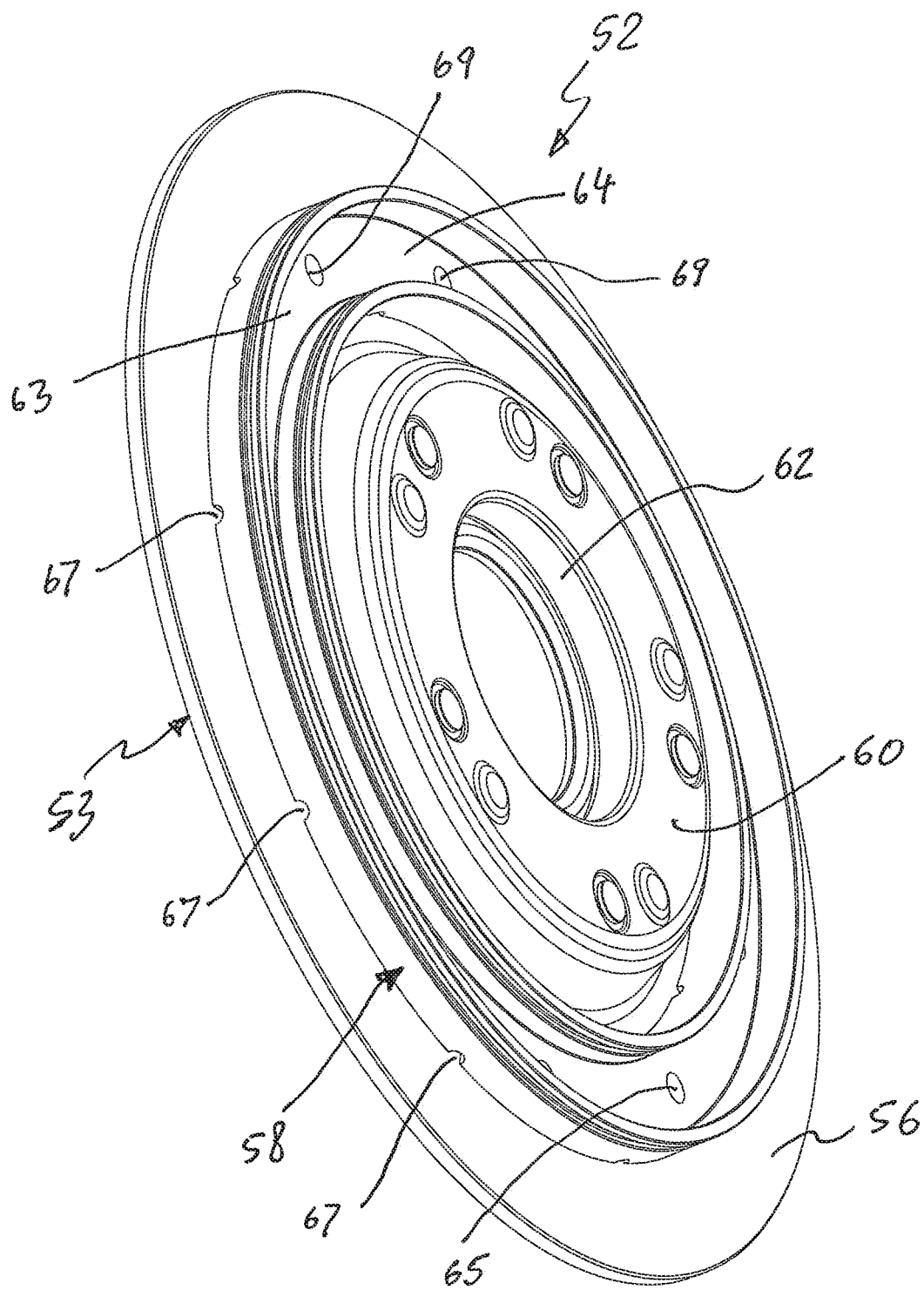
FIG. 7A is a perspective view from the rear of a main piston of a dual piston assembly in accordance with the first exemplary embodiment of the present invention.

Moreover, the main piston 52 is provided with at least one piston communication hole 57 axially extending through the annular main piston plate 56 of the main piston body 53. According to the first exemplary embodiment of the present invention, the main piston 52 includes a plurality of piston communication holes 57 axially extending through the annular main piston plate 56 of the main piston body 53 and spaced circumferentially equidistantly (or equiangularly) from one another around the rotational axis X, as best shown in FIGS. 7A and 7B.

Figure 8A:
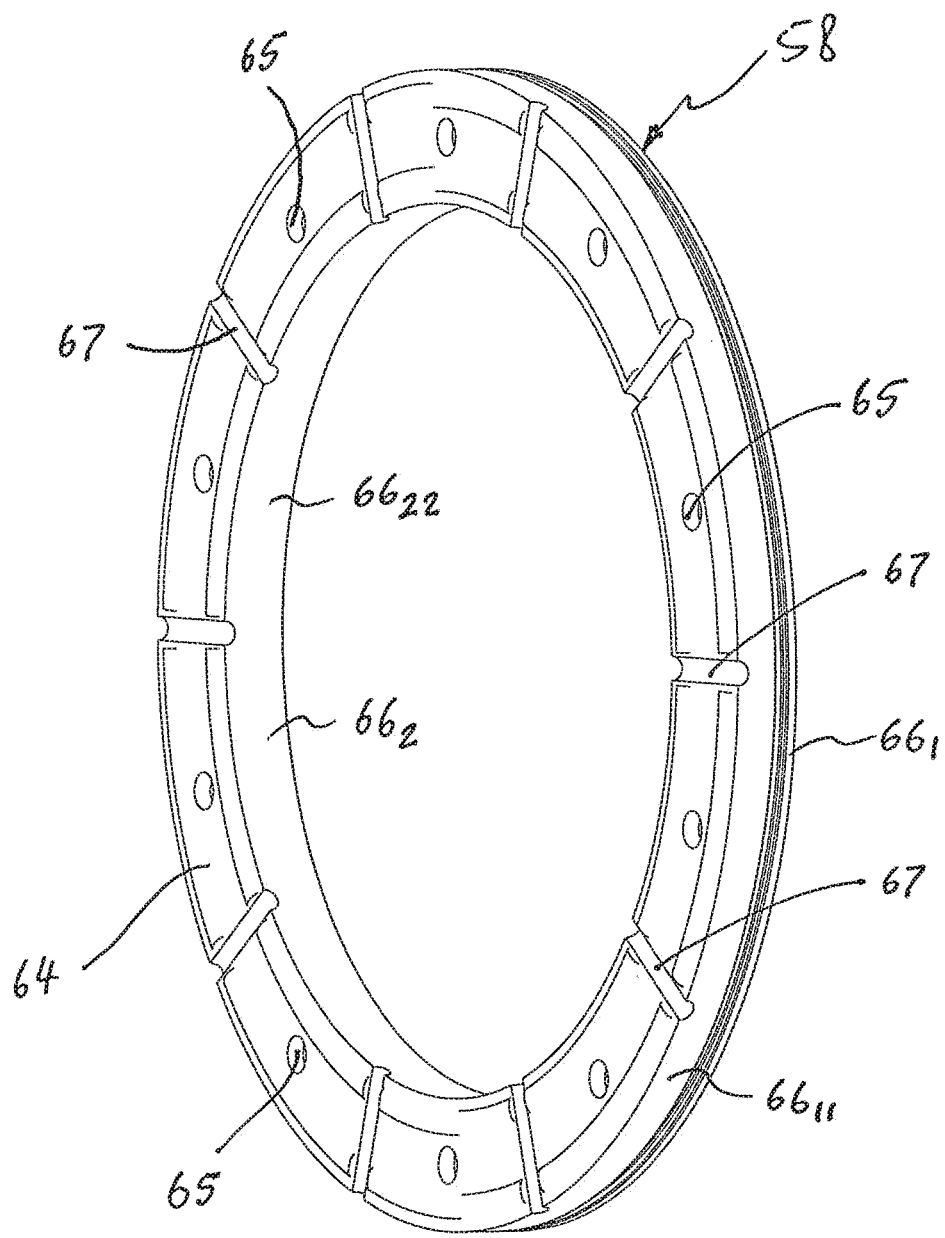
FIG. 8A is a perspective view from the front of an actuator casing of the dual piston assembly in accordance with the first exemplary embodiment of the present invention.
Figure 8B:
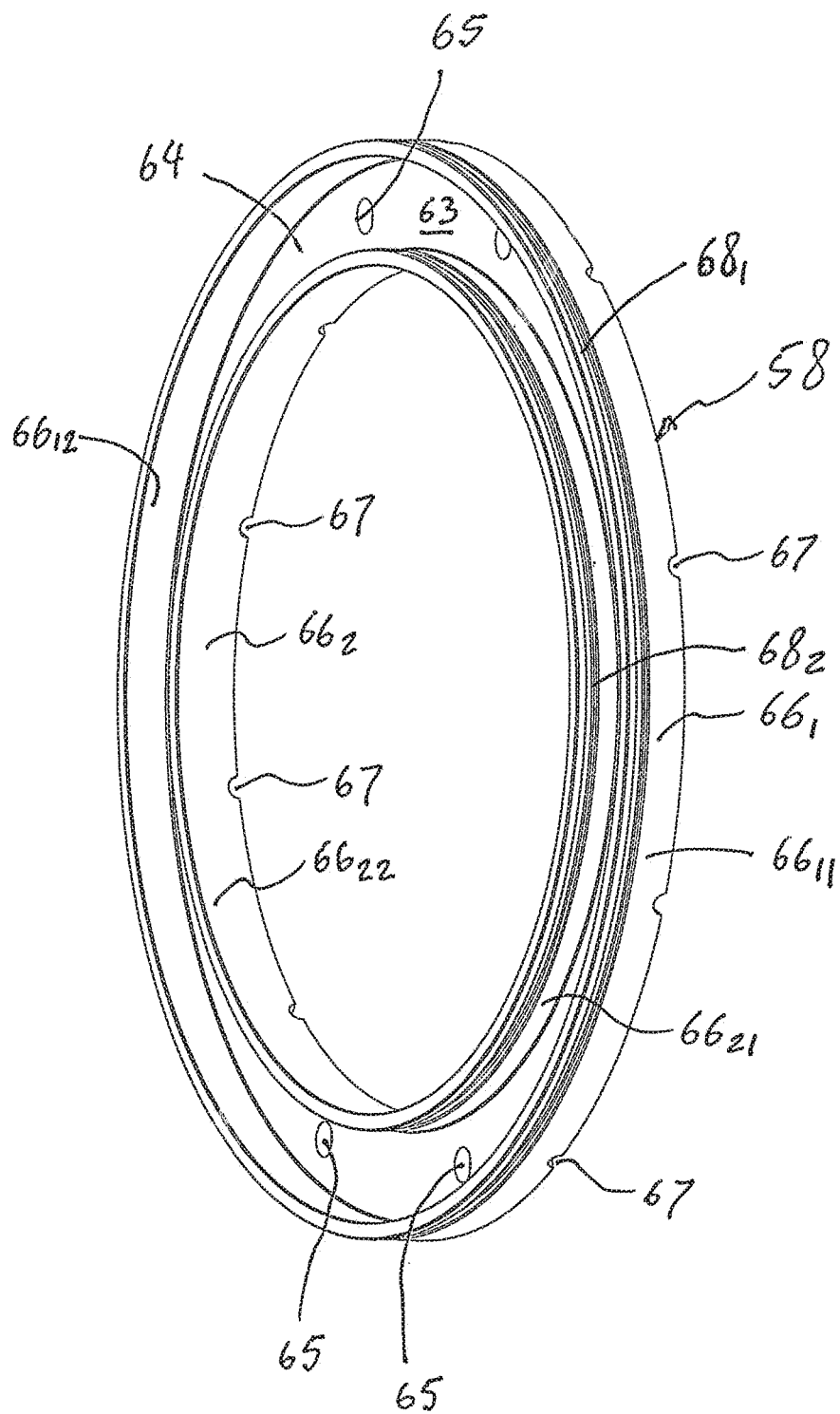
FIG. 8B is a perspective view from the rear of the actuator casing of the dual piston assembly in accordance with the first exemplary embodiment of the present invention.

As best shown in FIGS. 8A and 8B, the actuator casing 58 includes a radially oriented annular plate 64 coaxial with the rotational axis X, a radially outer cylindrical piston flange $66_1$ and a radially inner cylindrical piston flange $66_2$, both axially extending from the annular plate 64 toward the cover shell 20 of the casing 12, away from the main piston plate 56 of the main piston body 53 and coaxial with the rotational axis X. Thus, the actuator casing 58 defines an annular secondary piston cavity (or cylinder) 63 formed between the radially outer and radially inner cylindrical piston flanges $66_1$ and $66_2$, and the annular plate 64. The annular secondary piston cavity 63 is coaxial with the rotational axis X, and protrudes axially parallel to the rotational axis X. The radially outer piston flange $66_1$ has a cylindrical radially outer peripheral surface $66_{11}$ and a cylindrical radially inner peripheral surface $66_{12}$. Similarly, the radially inner piston flange $66_2$ has a cylindrical radially outer peripheral surface $66_{21}$ and a cylindrical radially inner peripheral surface $66_{22}$.

Moreover, the actuator casing 58 is provided with at least one actuator communication hole 65 axially extending through the annular plate 64 of the actuator casing 58. According to the exemplary embodiment of the present invention, the actuator casing 58 includes a plurality of actuator communication holes 65 axially extending through the annular plate 64 of the actuator casing 58 and spaced circumferentially equidistantly (or equiangularly) from one another around the rotational axis X, as best shown in FIGS. 8A and 8B.

Figure 4A:
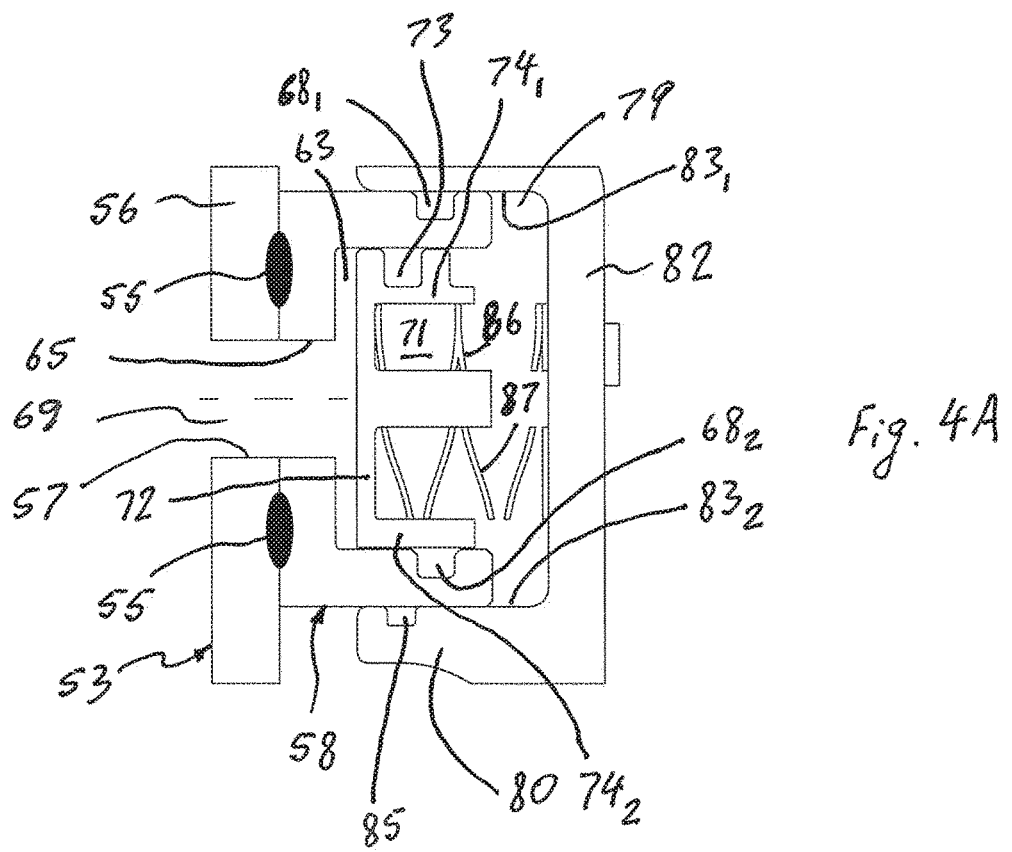
FIG. 4A is an enlarged view of a fragment of the hydrokinetic torque-coupling device shown in the rectangle "4A" of FIG. 3A.

As further best illustrated in FIGS. 4A and 5, each of the piston communication holes 57 of the main piston body 53 has a diameter equal to the diameter of each of the actuator communication holes 65 of the actuator casing 58. Moreover, the number of the piston communication holes 57 corresponds to the number of the actuator communication holes 65. Also, as best illustrated in FIGS. 4A and 5, each of the piston communication holes 57 of the main piston body 53 is complementary to and coaxial with one of the actuator communication holes 65 of the actuator casing 58. Thus, one of the piston communication holes 57 and one of the actuator communication holes 65 of the main piston 52 collectively form an axial communication channel 69 through the main piston 52 that provides axial fluid communication between the apply chamber $C_A$ and the secondary piston cavity 63 of the actuator casing 58 of the main piston 52.

Also, the main piston 52 is provided with at least one radial communication channel 67 radially extending through the main piston 52. Specifically, according to the exemplary embodiment of the present invention, the radial communication channel 67 is formed in the actuator casing 58 and radially extends through the annular plate 64 of the actuator casing 58. According to the exemplary embodiment of the present invention, the actuator casing 58 includes a plurality of radial communication channels 67 spaced circumferentially equidistantly (or equiangularly) from one another around the rotational axis X, as best shown in FIGS. 8A and 8B. Moreover, the radial communication channels 67 are radially extending between the annular plate 64 of the actuator casing 58 and the main piston plate 56 of the main piston body 53 so as to provide radial fluid communication through the main piston 52 in the release chamber $C_R$, as best shown in FIGS. 3B and 4C.

The main piston 52 is non-rotatably coupled to the cover hub 46, such as by means of a set of elastic (or flexible and resilient) tongues 89, which non-rotatably connect the cover hub 46 and the main piston 52, and which are oriented tangentially between the cover hub 46 and the main piston 52, while permitting axial displacement of the main piston 52 relative to the cover hub 46. Specifically, as best shown in FIGS. 5 and 7B, one free end of each of the axially flexible tongues 89 is secured to the hub portion 60 of the main piston body 53, while an opposite free end of each of the elastic tongues 89 is secured to a strap plate 88, which, in turn, is fixed to the cover hub 46 by appropriate means, such as by rivets or welding. The axially flexible tongues 89 are configured to transmit torque between the main piston 52 and the cover hub 46, while allowing axial displacement of the main piston 52 relative to the cover hub 46. In other words, the elastic tongues 89 may deform elastically in the axial direction to enable axial movement of the main piston 52 relative to the cover hub 46. The resilient tongues 89 bias the main piston 52 away from the locking surface 12e of the cover shell 20. Alternatively, the main piston body 53 of the main piston 52 may be non-rotatably coupled to the cover hub 46 by be spline connection or interference connection, as well known in the art. In any case, the main piston body 53 of the main piston 52 according to the first exemplary embodiment of the present invention is non-rotatably coupled to the cover hub 46, while axially moveable relative to the cover hub 46.

The main piston 52 is axially moveable relative to the cover shell 20 between a lockup (or engaged) position and a non-lockup (or disengaged) position of the lockup clutch 16. In the lockup position of the lockup clutch 16, as best shown in FIGS. 14A, 14B, 15C, 16A, 16B and 17C, the main piston 52 non-rotatably frictionally engages the locking surface 12e of the cover shell 20 of the casing 12 through the friction ring 48. In the non-lockup position of the lockup clutch 16, as best shown in FIGS. 3A, 3B and 4C, the main piston 52 and the friction ring 48 are axially spaced (i.e., frictionally disengaged) from the locking surface 12e of the cover shell 20 of the casing 12 and does not frictionally engage the cover shell 20 of the casing 12. In the lockup position of the lockup clutch 16, the friction ring 48 is non-rotatably coupled to the casing 12 so as to non-rotatably couple the casing 12 to the turbine hub 40 through the turbine shell 34. In the non-lockup position of the lockup clutch 16, as best shown in FIGS. 3A, 3B, 4C, 5, 18A, 18B and 19C, the casing 12 is rotatably coupled to the turbine hub 40 through the torque converter 14. Moreover, the strap plate 88 limits axial movement of the main piston 52 in the direction away from the locking surface 12e of the cover shell 20, i.e., toward the non-lockup position of the lockup clutch 16, as best shown in FIGS. 3A, 3B, 18A and 18B.

The cover shell 20 of the casing 12 includes an axially protruding annular piston cup 80 coaxial with the rotational axis X and formed integrally with the cover shell 20 of the casing 12, as best shown in FIGS. 4A-4C, 5 and 11A. The annular piston cup 80 of the cover shell 20 defines an annular main piston cylinder 79 coaxial with the rotational axis X. As further shown in FIGS. 4A-4C, 5 and 11A, the piston cup 80 includes an annular axial flange 81 axially protruding from a radial wall 82 toward the main piston 52 and formed integrally with the cover shell 20 of the casing 12. The piston cup 80 has a cylindrical, radially outer surface $83_1$ and a cylindrical, radially inner surface $83_2$ facing the cylindrical radially outer surface $83_1$. Both the cylindrical radially outer and inner surfaces $83_1$ and $83_2$, respectively, extend axially parallel to the rotational axis X. Together, the cylindrical radially outer and inner surfaces $83_1$ and $83_2$, and an axially inner surface 83 of the radial wall 82 of the piston cup 80 of the cover shell 20 form the annular main piston cylinder 79 (best shown in FIGS. 4A-4C and 11A) slidingly receiving the annular actuator casing 58 therein. In other words, the annular actuator casing 58 is axially slidably mounted within the annular main piston cylinder 79 of the cover shell 20 of the casing 12, as best shown in FIGS. 3A-5. In turn, the annular secondary piston 54 is configured to reciprocatingly slide within the annular secondary piston cavity 63, as best shown in FIGS. 4A-4C and 5.

Figure 11A:
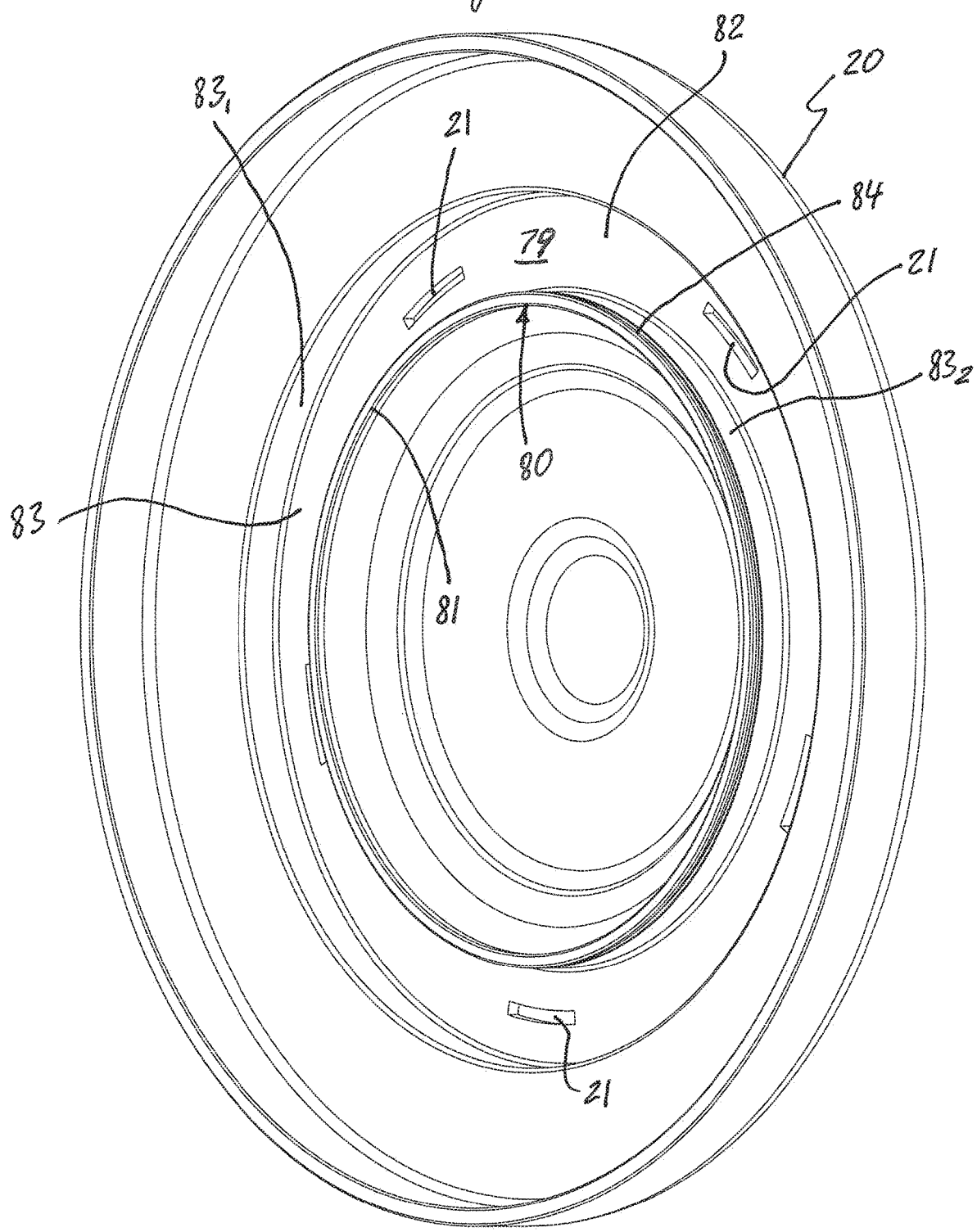
FIG. 11A is a perspective view from the front of the cover shell of the hydrokinetic torque-coupling device in accordance with the first exemplary embodiment of the present invention.

The cover shell 20 of the casing 12 with the piston cup 80 is preferably an integral (or unitary) component, e.g., made of a single part, for example, by press-forming one-piece metal sheets, or separate components fixedly connected together. The annular actuator casing 58 of the main piston 52 is rectilinearly moveable in the piston cup 80 of the cover shell 20. According to an exemplary embodiment of the present invention, as best shown in FIG. 11A, the cylindrical radially outer peripheral surface 66ii of the radially outer piston flange $66_1$ of the actuator casing 58 sealingly and slidingly engages the cylindrical radially outer surface $83_1$ of the piston cup 80. Similarly, the cylindrical radially inner peripheral surface $66_{22}$ of the radially inner piston flange $66_2$ of the actuator casing 58 sealingly and slidingly engages the cylindrical radially inner surface $83_2$ of the piston cup 80. First and second annular main piston sealing members (e.g., O-rings) $68_1$ and 85, respectively, are disposed between the actuator casing 58 and the piston cup 80. Thus, the actuator casing 58 is sealed within the piston cup 80 by the main piston sealing members $68_1$ and 85. Specifically, the first main piston sealing member $68_1$ is located between the radially outer peripheral surface $66_{11}$ of the radially outer piston flange $66_1$ of the actuator casing 58 and the radially outer surface $83_1$ of the piston cup 80. The first main piston sealing member $68_1$ is disposed in an annular groove formed in the radially outer peripheral surface $66_{11}$ of the radially outer piston flange $66_1$. As a result, the pressure within the secondary piston cavity 63 of the actuator casing 58 is maintained equal to the pressure in the apply chamber $C_A$ by isolating the secondary piston cavity 63 from the release chamber $C_R$. Similarly, the second main piston sealing members 85 is located between the radially inner peripheral surface $66_{22}$ of the radially inner piston flange $66_2$ of the actuator casing 58 and the radially inner surface $83_2$ of the piston cup 80. The second main piston sealing members 85 is disposed in an annular groove formed in the radially inner surface $83_2$ of the piston cup 80.

The secondary piston 54 of the exemplary embodiment of the present invention includes a cylindrical hollow body 70 having an annular (or ring-like) head plate (or head member) 72, a radially outer cylindrical skirt $74_1$ and a radially inner cylindrical skirt $74_2$ radially spaced from the radially outer cylindrical skirt $74_1$. Both the radially outer cylindrical skirt $74_1$ and the radially inner cylindrical skirt $74_2$ axially extend from the head plate 72 of the secondary piston 54 toward an axially inner surface 83 of the radial wall 82 of the piston cup 80 of the cover shell 20, and form a hollow chamber 71 within the secondary piston 54. As illustrated in FIGS. 4A-4C and 5, the head plate 72 of the secondary piston 54 is axially spaced from the main piston plate 56 of the main piston body 53 and the radially oriented annular plate 64 of the actuator casing 58. As further illustrated in FIGS. 4A-4C and 5, the annular secondary piston cavity 63 is formed between the radially oriented annular plate 64 of the actuator casing 58 and the head plate 72 of the secondary piston 54.

The secondary piston 54 further includes at least one curved (arcuate) actuator tab 76 axially extending from the head plate 72 through the annular main piston cylinder 79 (or the piston cup 80). According to the exemplary embodiment of the present invention, the secondary piston 54 includes a plurality of curved (arcuate) actuator tabs 76, each axially extending from the head plate 72 through the annular main piston cylinder 79 (or the piston cup 80), as best shown in FIGS. 4B and 9. The actuator tabs 76 are equiangularly and equidistantly spaced from each other. According to the exemplary embodiment, the actuator tabs 76 are disposed radially the same distance from the rotational axis X. A snap ring 78 is mounted to free distal ends 77 of the actuator tabs 76. As best shown in FIGS. 4B and 4C, the snap ring 78 is disposed outside of the cover shell 20 for limiting axial movement of the secondary piston 54 toward the turbine wheel 26 and away from the cover shell 20 when the snap ring 78 mounted on the actuator tabs 76 of the secondary piston 54 engages the radial wall 82 of the cover shell 20. The free distal end 77 of each of the actuator tabs 76 of the secondary piston 54 axially extends through one of holes 21 extending through the radial wall 82 of the cover shell 20, as best shown in FIGS. 4B and 4C. Each of the holes 21 through the cover shell 20 is geometrically complementary to one of the actuator tabs 76 of the secondary piston 54. The secondary piston 54 with the head plate 72, the radially outer and inner cylindrical skirts $74_1$ and $74_2$, and the actuator tabs 76 are preferably an integral (or unitary) component, e.g., made of a single part, for example, by molding, casting or machining, or includes separate components fixedly connected together.

Outer and inner annular secondary piston sealing members 73 and $68_2$, respectively, are disposed between the secondary piston 54 and the actuator casing 58. Thus, the secondary piston 54 is sealed within the secondary piston cavity 63 of the actuator casing 58 by the outer and inner annular secondary piston sealing members 73 and $68_2$, respectively. Specifically, the outer secondary piston sealing member 73 is located between the radially inner peripheral surface $66_{12}$ of the radially outer piston flange $66_1$ of the actuator casing 58 and the radially outer surface 83$_1$ of the piston cup 80. The outer secondary piston sealing member 73 is disposed in an annular groove 75 formed in the radially outer cylindrical skirt 74$_1$ of the secondary piston 54 and facing the cylindrical radially inner peripheral surface 66$_{12}$ of the radially outer piston flange 66$_1$ of the actuator casing 58. The annular groove 75 is formed in the radially outer cylindrical skirt 74$_1$ of the secondary piston 54, for example, by molding, machining or casting. The inner secondary piston sealing member 68$_2$ is disposed between the secondary piston 54 and the actuator casing 58.

The sealing members 73 and 68$_2$ are preferably O-rings. According to the exemplary embodiment of the present invention, the secondary piston 54 is axially reciprocatingly and sealingly moveable relative to the main piston cylinder 79 of the cover shell 20 of the casing 12. The outer and inner annular secondary piston sealing members 73 and 68$_2$ create a seal at the interface of the main piston cylinder 79 and the secondary piston 54.

Figure 10B:
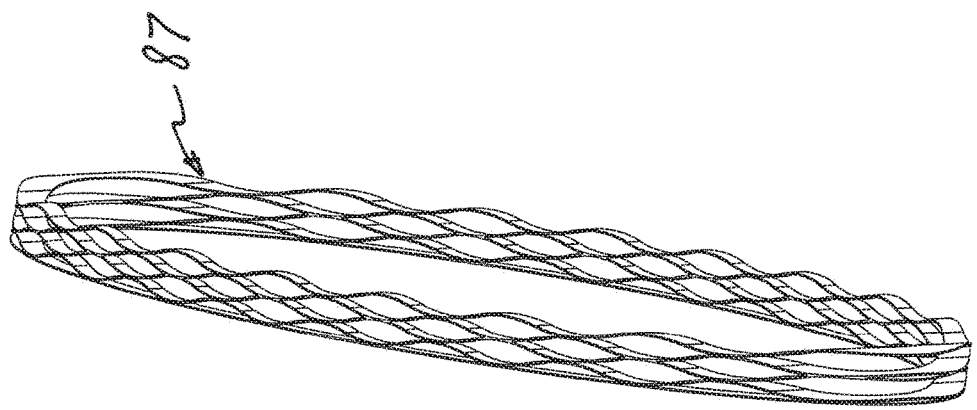
FIG. 10B is a perspective view of an inner spring of the dual piston assembly in accordance with the first exemplary embodiment of the present invention.
Figure 10A:
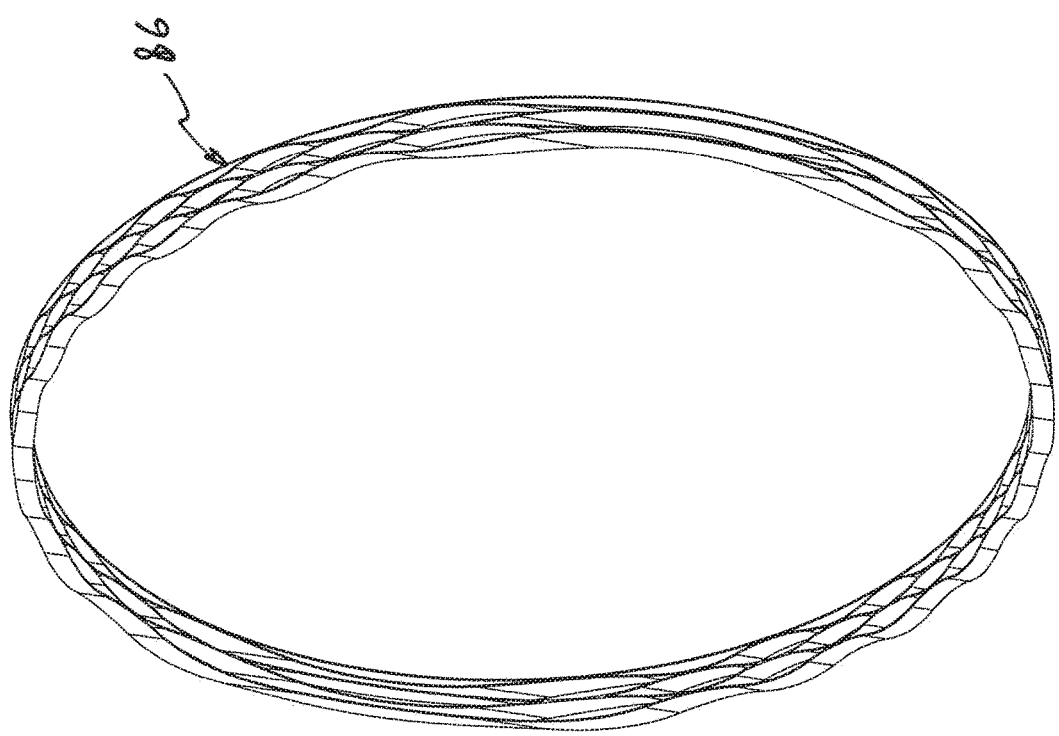
FIG. 10A is a perspective view of an outer spring of the dual piston assembly in accordance with the first exemplary embodiment of the present invention.

The secondary piston 54 is axially biased by at least one compression spring away from the cover shell 20 of the casing 12. According to the first exemplary embodiment, the dual piston assembly 44 includes outer and inner compression springs (such as multi-turn wave springs) 86 and 87, respectively, as best shown in FIGS. 10A and 10B. Each of the outer and inner compression springs 86 and 87 axially biases the secondary piston 54 away from the cover shell 20 of the casing 12, as best shown in FIGS. 3A and 3B. The compression springs 86 and 87 are disposed within the hollow chamber 71 of the secondary piston 54 between the radially outer cylindrical skirt 74$_1$ and the radially inner cylindrical skirt 74$_2$ of the cylindrical hollow body 70. Specifically, the outer compression spring 86 is disposed radially outside of the actuator tabs 76 of the secondary piston 54, while the inner compression spring 87 is disposed radially inside of the actuator tabs 76 of the secondary piston 54, as best shown in FIGS. 4A-4C and 5.

The secondary piston 54 is axially moveable relative to the main piston 52 (i.e., relative to the main piston body 53 and the actuator casing 58) and the piston cup 80 of the cover shell 20 between an extended position and a retracted position with respect to the main piston 52. In the extended position, shown in FIGS. 3A-4C, 5 and 14A-15C, the secondary piston 54 extends leftward into the annular secondary piston cavity 63 between the secondary piston 54 and the main piston body 53 away from the radial wall 82 of the piston cup 80 of the cover shell 20, so that the snap ring 78 on the actuator tabs 76 of the secondary piston 54 engages the radial wall 82 of the piston cup 80 of the cover shell 20. Moreover, the compression springs 86 and 87 bias the secondary pistons 54 to the extended position. In the retracted position, shown in FIGS. 16A-19C, the secondary pistons 54 are retracted into the piston cup 80 of the cover shell 20 toward the radial wall 82 of the piston cup 80 so that the snap rings 76 on the piston rods 74 of the secondary pistons 54 are axially spaced away from the radial wall 82 of the piston cup 80 of the cover shell 20 toward the selective clutch 18.

The selective clutch 18 is disposed outside of the casing 12 between the output shaft 5 of the ICE 4 and the cover shell 20 of the casing 12. The selective clutch 18 includes an input member 90, an output member 93 selectively and non-rotatably connectable to the input member 90, and a spring member 97 disposed between the input member 90 and the output member 93 of the selective clutch 18.

The input member 90 includes a clutch casing 91 including an integral, radially orientated annular friction plate 92. The annular friction plate 92 defines a friction surface 92*e* facing the output member 93, as best shown in FIG. 4C. The output member 93 includes a friction disc 94 and an annular friction liner 96 attached to the friction disc 94, such as by adhesive bonding, so as to axially face the friction surface 92*e* of the clutch casing 91, as best shown in FIGS. 4C, 12, 15C, 17C and 19C. The clutch casing 91 of the input member 90 is rotatably mounted to a central boss 27 of the cover shell 20 though a slide bearing 98, while non-ratably coupled (preferably, non-moveably secured, such as by fasteners) to the crankshaft 5 of the ICE 4, as best shown in FIG. 5. According to the exemplary embodiment, the clutch casing 91 of the input member 90 is non-moveably secured to the crankshaft 5 of the ICE 4.

Figure 11B:
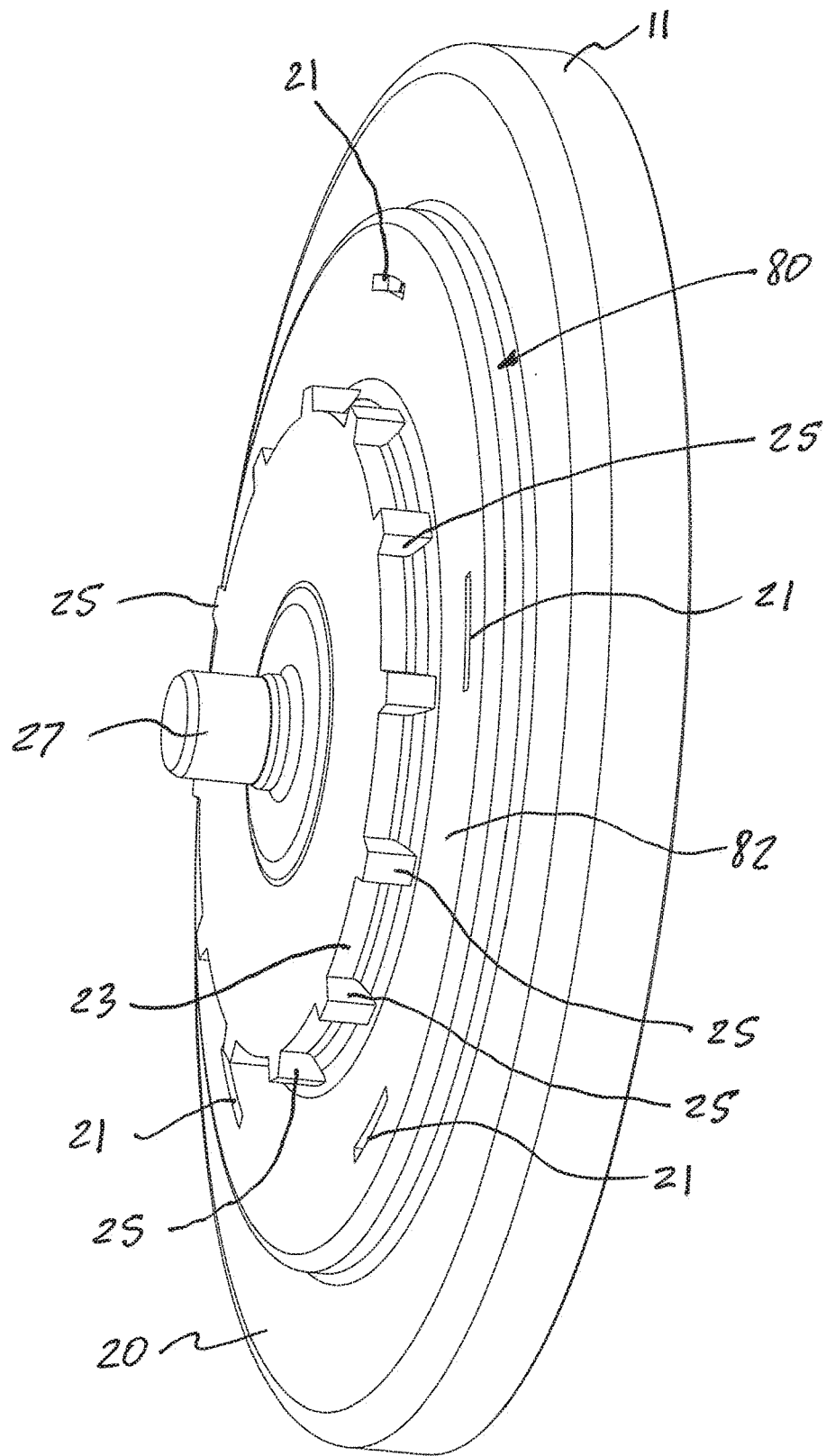
FIG. 11B is a perspective view from the rear of the cover shell of the hydrokinetic torque-coupling device in accordance with the first exemplary embodiment of the present invention.

As best illustrated in FIG. 12, the friction disc 94 of the output member 93 is provided with one or more grooves 95 formed on a radially inner perimeter thereof. According to the exemplary embodiment, the friction disc 94 has a plurality of grooves 95, as illustrated in FIG. 12. The grooves 95 are equiangularly and equidistantly spaced from each other. The friction disc 94 with the grooves 95 is preferably an integral (or unitary) part, e.g., made of a single or unitary component, but may be separate components fixedly connected together. Preferably, the grooves 95 are press-cut on the friction disc 94. Moreover, as best shown in FIG. 11B, the cover shell 20 of the casing 12 is provided with one or more teeth 25 formed on a support boss 23 thereof. The teeth 25 are equiangularly and equidistantly spaced from each other. The cover shell 20 with the support boss 23 and the teeth 25 is an integral (or unitary) part, e.g., made of a single or unitary component, but may be separate components fixedly connected together. Preferably, the teeth 25 are machined on the support boss 23 of the cover shell 20. The grooves 95 are complementary to the teeth 25 of the cover shell 20 and are configured to slideably mesh with the teeth 25, so as to non-rotatably couple the output member 93 of the selective clutch 18 relative to the cover shell 20 of the casing 12, and permit axial displacement of the output member 93 relative to the cover shell 20. Alternatively, the output member 93 of the selective clutch 18 may be non-rotatably and axially slidably coupled to the cover shell 20 of the casing 12 by be spline connection, well known in the art.

The output member 93 of the selective clutch 18 is selectively axially moveable relative to the input member 90 between an engaged position and a disengaged position of the selective clutch 18. In the engaged position of the selective clutch 18, shown in FIGS. 3A, 3B, 4C, 5, 14A, 14B and 15C, the output shaft 5 of the ICE 4 is non-rotatably coupled to the casing 12 through the selective clutch 18 that permits transmission of the drive torque from the output shaft 5 of the ICE 4 to the casing 12 in one direction only, specifically from the ICE 4 to the casing 12, but not from the casing 12 to the ICE 4. In the disengaged position of the selective clutch 18, shown in FIGS. 16A, 16B, 17C, 18A, 18B and 19C, the output shaft 5 of the ICE 4 is drivingly disconnected from the casing 12.

Figure 13:
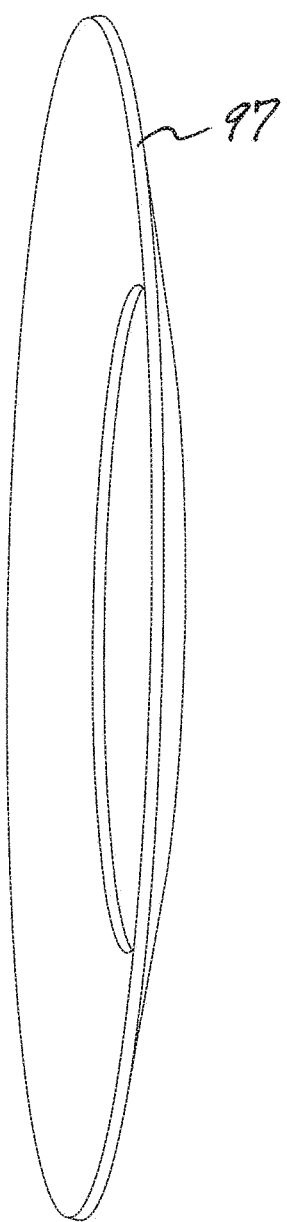
FIG. 13 is a perspective view of a spring member of the selective clutch in accordance with the first exemplary embodiment of the present invention.

According to the exemplary embodiment, the spring member 97 of the selective clutch 18 is a disc spring, as best shown in FIG. 13. Those skilled in the art understand that other appropriate springs are within the scope of the present invention. As best shown in FIGS. 3A, 3B, 4C, 5, 14A, 14B and 15C, the spring member 97 biases the output member 93 toward the engaged position. Moreover, a rate (or stiffness) of the spring member 97 is such that the output member 93 non-rotatably engages the friction plate 92 of the clutch casing 91 in the engaged position of the selective clutch 18, thus non-rotatably coupling the casing 12 of the hydrokinetic torque-coupling device 10 to the output shaft 5 of the ICE 4. As best shown in FIGS. 3A, 3B, 4C, 5, 14A, 14B and 15C, the actuator tabs 76 of the secondary piston 54 axially extend through the holes 21 in the radial wall 82 of the cover shell 20 so that the free distal ends 77 of the actuator tabs 76 engage (i.e., are in contact with) the friction disc 94 of the output member 93 of the selective clutch 18.

Thus, the single annular secondary piston 54 of the exemplary embodiment of the present invention equalizes pressure to the output member 93 of the selective clutch 18, and decrease manufacturing cost and complexity of the dual piston assembly 44.

The outer and inner compression springs 86 and 87 of the secondary piston 54 are sized to resist fluid pressure of 500 KPa. Other pressures are within the scope of the invention. In other words, when the fluid pressure in the apply chamber $C_A$ is equal to or more than 500 KPa, the secondary piston 54 moves rightward in the direction of FIGS. 3A-5 toward the cover shell 20 of the casing 12 and axially displaces the friction disc 94 of the output member 93 of the selective clutch 18 to the disengaged position.

The hydrokinetic torque-coupling device 10 in accordance with the present invention has four modes of operation.

In a first mode of operation, illustrated in FIGS. 3A-5, the release pressure of the lock-up clutch 16 in the release chamber $C_R$ is about 500 KPa, while the apply pressure of the lock-up clutch 16 in the apply chamber $C_A$ is about 200 KPa. Consequently, due to the pressure differential, the main piston 52 is in the non-lockup position and the secondary piston 54 is in the extended position, in which both the main piston 52 and the secondary piston 54 are spaced from the cover shell 20 a maximum distance. In that event, the friction ring 42 does not frictionally engage the locking surface 12e of the cover shell 20 of the casing 12 by the main piston 52 (i.e., the non-lockup position of the lock-up clutch 16), and the output member 93 of the selective clutch 18 is in the engaged position. In the first mode of operation, the main piston 52 is axially spaced from the friction ring 42, and the torque-coupling device 10 is in a hydrodynamic mode with the ICE 4 drivingly coupled thereto.

Figure 14A:
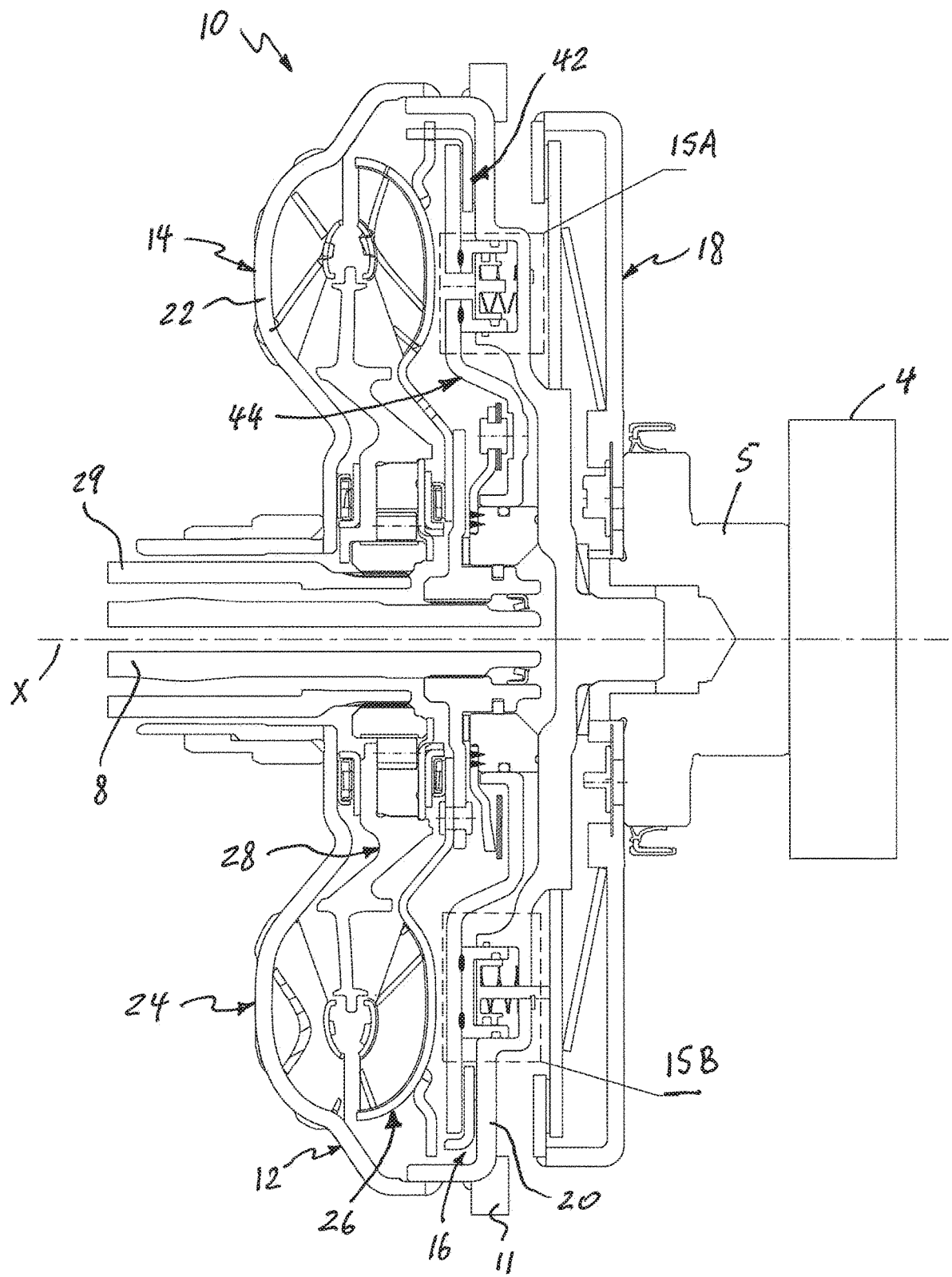
FIG. 14A is a first sectional view of the hydrokinetic torque-coupling device in accordance with the first exemplary embodiment of the present invention in a second mode of operation.
Figure 14B:
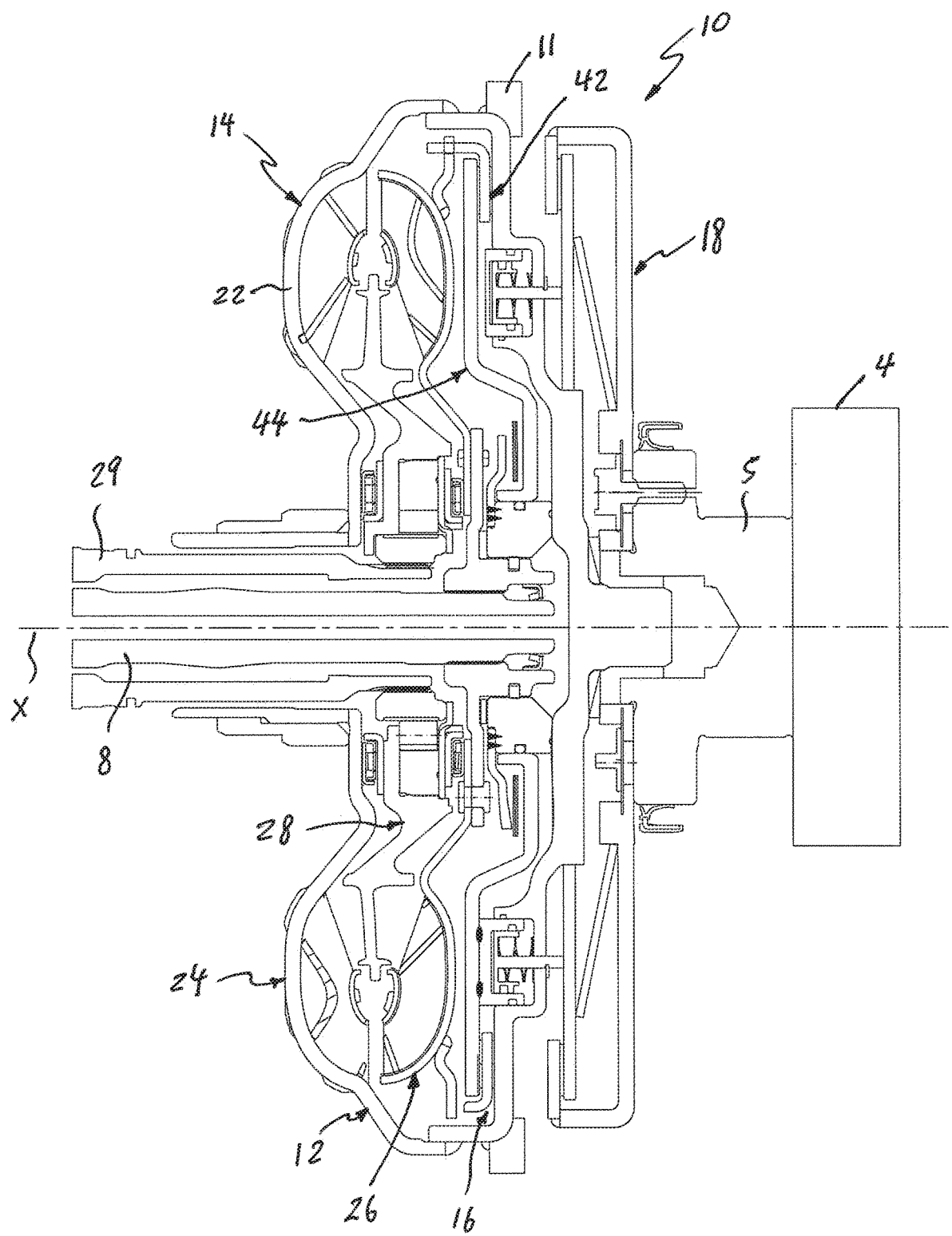
FIG. 14B is a second sectional view of the hydrokinetic torque-coupling device in accordance with the first exemplary embodiment of the present invention in the second mode of operation.
Figure 15A:
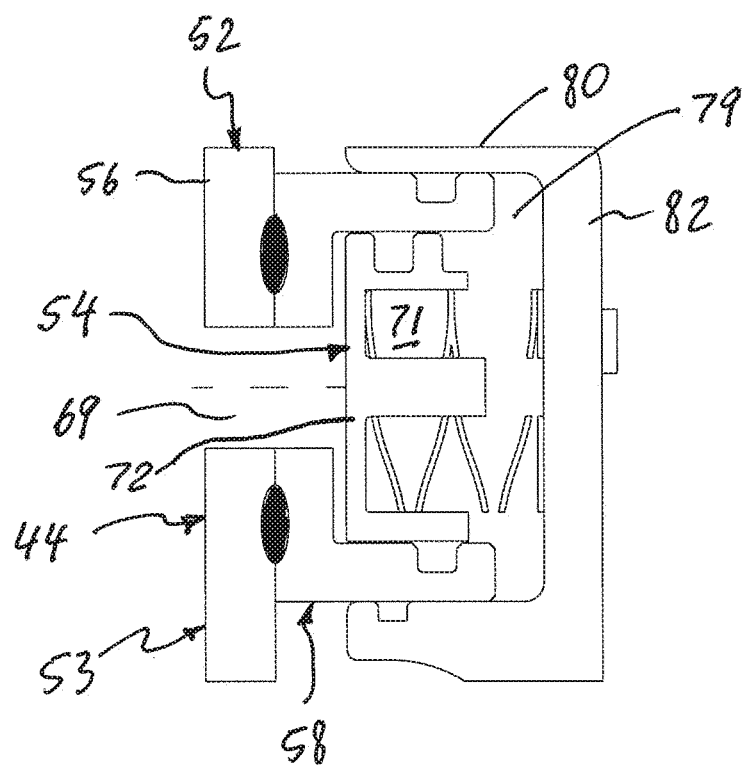
FIG. 15A is an enlarged view of a fragment of the hydrokinetic torque-coupling device shown in the rectangle "15A" of FIG. 14A.
Figure 15B:
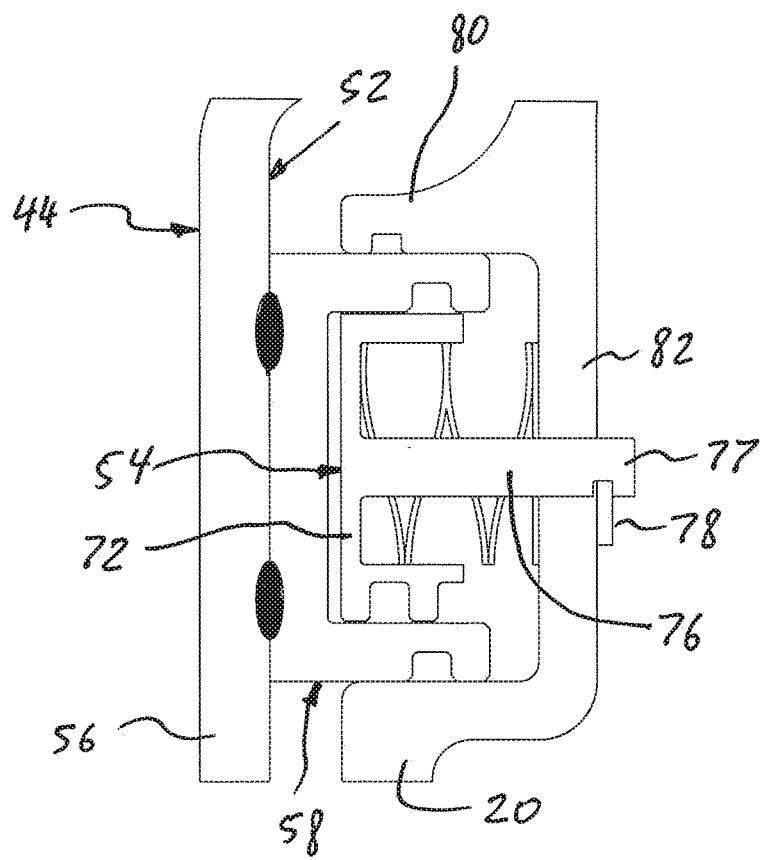
FIG. 15B is an enlarged view of a fragment of the hydrokinetic torque-coupling device shown in the rectangle "15B" of FIG. 14A.
Figure 16A:
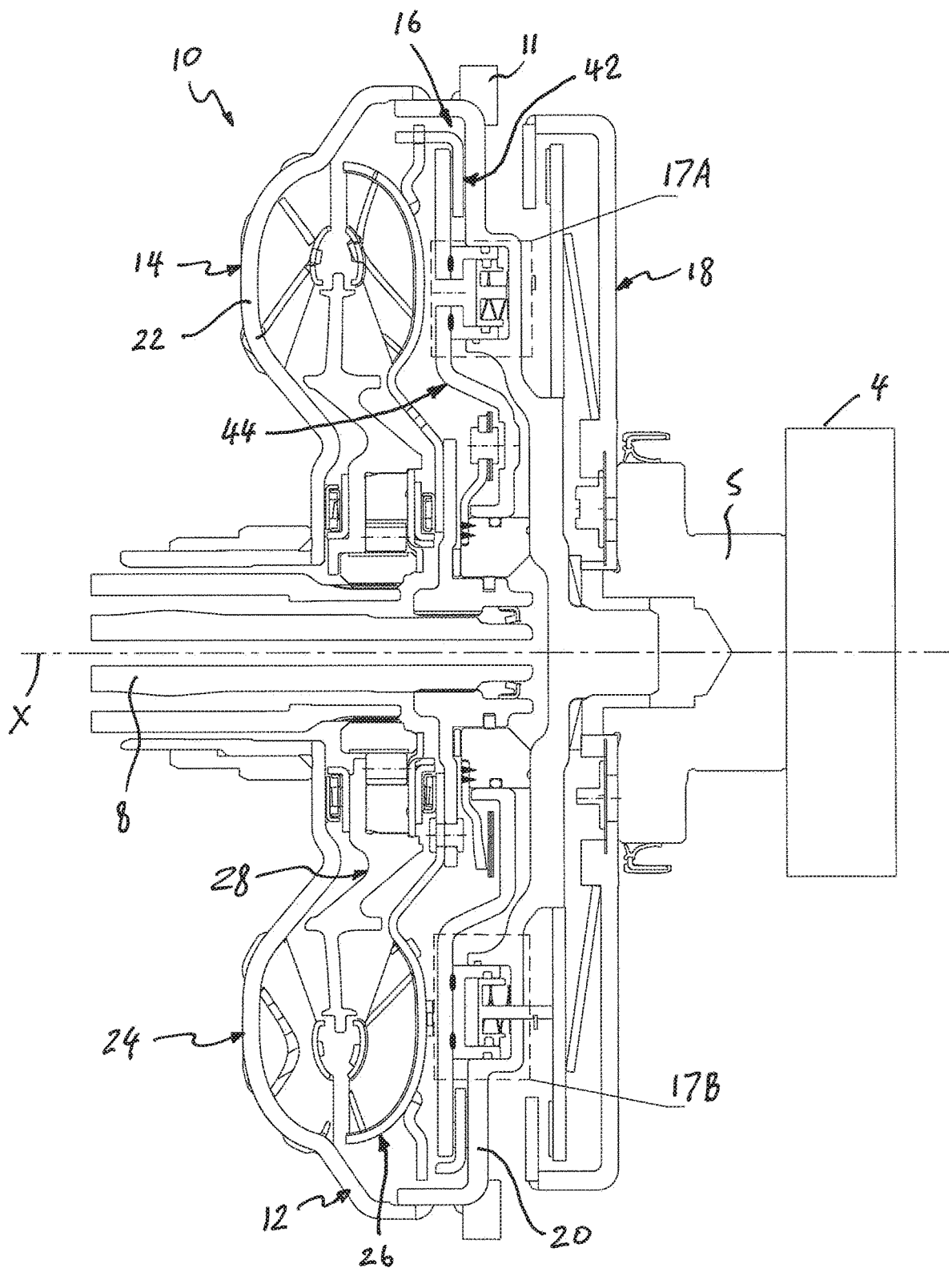
FIG. 16A is a first sectional view of the hydrokinetic torque-coupling device in accordance with the first exemplary embodiment of the present invention in a third mode of operation.
Figure 16B:
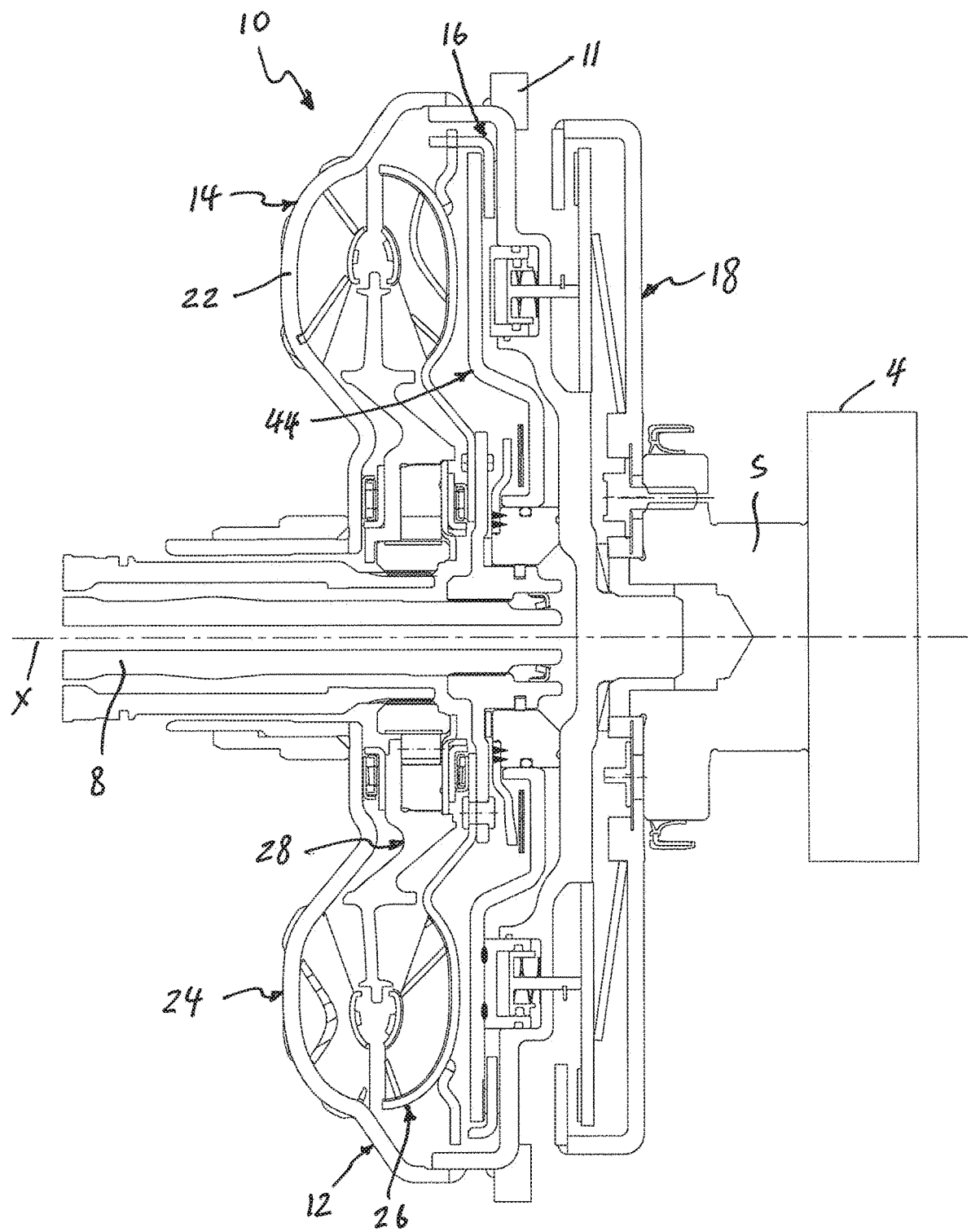
FIG. 16B is a second sectional view of the hydrokinetic torque-coupling device in accordance with the first exemplary embodiment of the present invention in the third mode of operation.
Figure 17A:
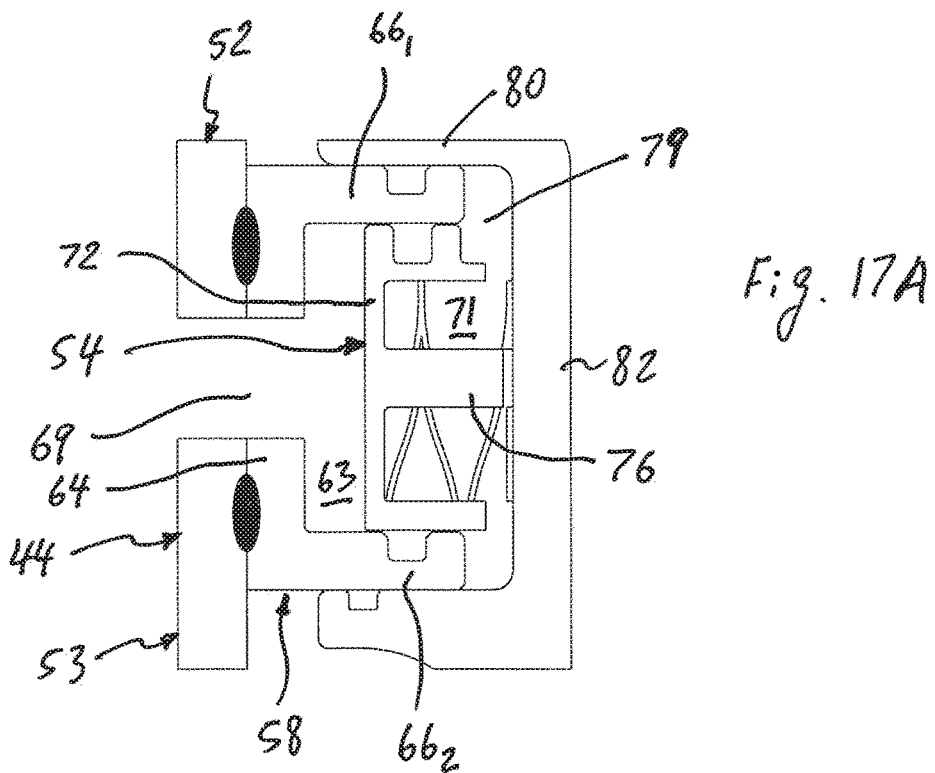
FIG. 17A is an enlarged view of a fragment of the hydrokinetic torque-coupling device shown in the rectangle "17A" of FIG. 16A.
Figure 17B:
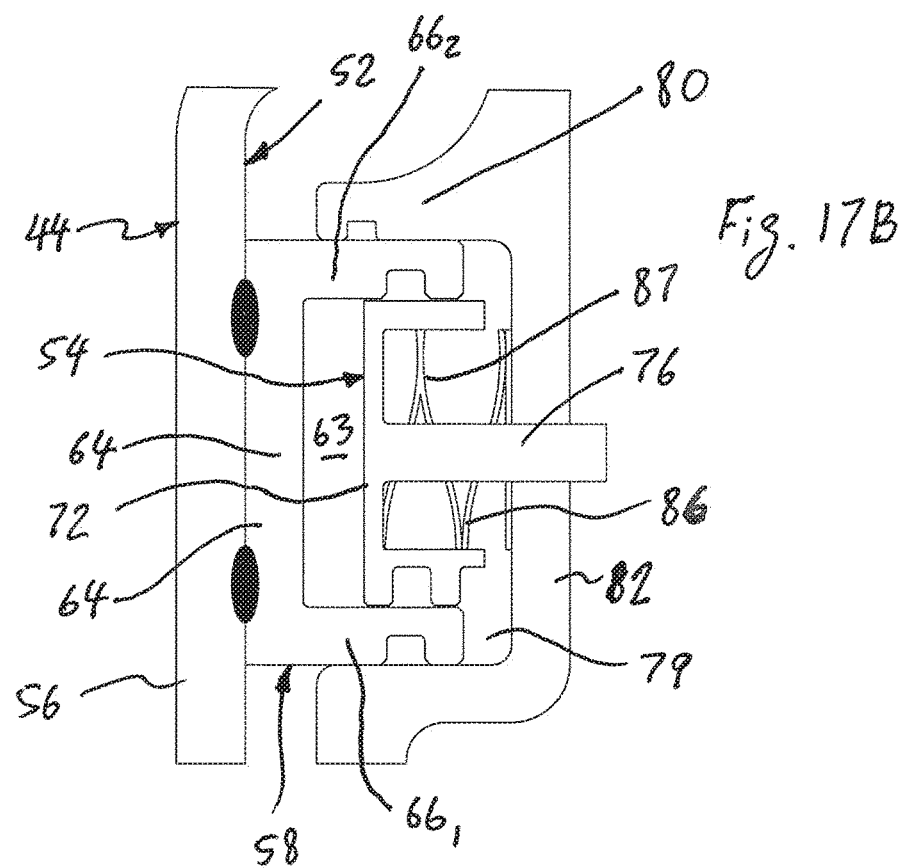
FIG. 17B is an enlarged view of a fragment of the hydrokinetic torque-coupling device shown in the rectangle "17B" of FIG. 16A.

In a second mode of operation, illustrated in FIGS. 14A-15C, the apply pressure of the lock-up clutch 16 in the apply chamber $C_A$ is between 0-500 KPa, preferably between 100-500 KPa. Consequently, the main piston 52 is moved rightward (as shown in FIGS. 14A, 14B and 15C) toward the cover shell 20 against the resilient forces of the tongues 89 to the lockup position. In that event, the main piston 52 presses against the friction portion 48 of the friction ring 42 to frictionally non-rotatably engage the friction ring 42 against the locking surface 12e of the cover shell 20 of the casing 12 (i.e., the lockup position of the lock-up clutch 16). The secondary piston 54 remains in the extended position, in which the output member 93 of the selective clutch 18 is in the engaged position. In the second mode of operation, the ICE 4 and the transmission shaft 8 are directly connected. In the second mode of operation a battery of the hybrid vehicle may be in charging mode.

In a third mode of operation, illustrated in FIGS. 16A-17C, the apply pressure of the lock-up clutch 16 in the apply chamber $C_A$ is between 500-800 KPa. Consequently, the secondary piston 54 moves rightward in the direction toward the cover shell 20 of the casing 12 and the selective clutch 18 to the retracted position to place the selective clutch 18 in the disengaged position. Specifically, the free distal ends 77 of the actuator tabs 76 push the friction disc 94 of the output member 93 away from the friction surface 92e of the friction plate 92 of the clutch casing 91 against the resilient force of the spring member 97, and place the selective clutch 18 in the disengaged position. The main piston 52 remains in the lockup position. In the third mode of operation, the ICE 4 and transmission shaft 8 are disconnected, and the electric machine 6 and the transmission shaft 8 are directly connected. The ICE 4 may be off. The hybrid vehicle is in re-generation mode or an electric-drive (or E-drive) mode.

Figure 18B:
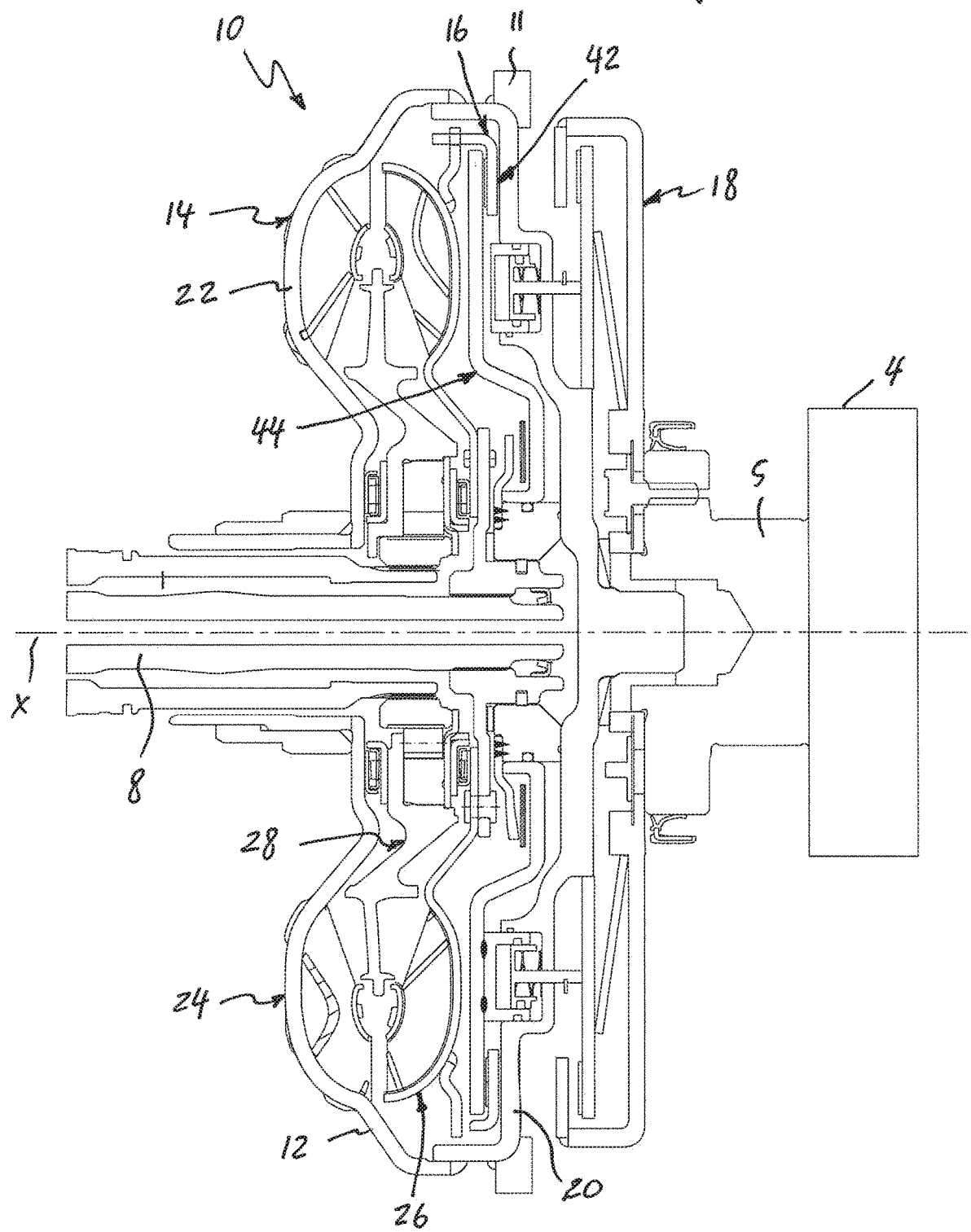
FIG. 18B is a second sectional view of the hydrokinetic torque-coupling device in accordance with the first exemplary embodiment of the present invention in the fourth mode of operation.
Figure 19A:
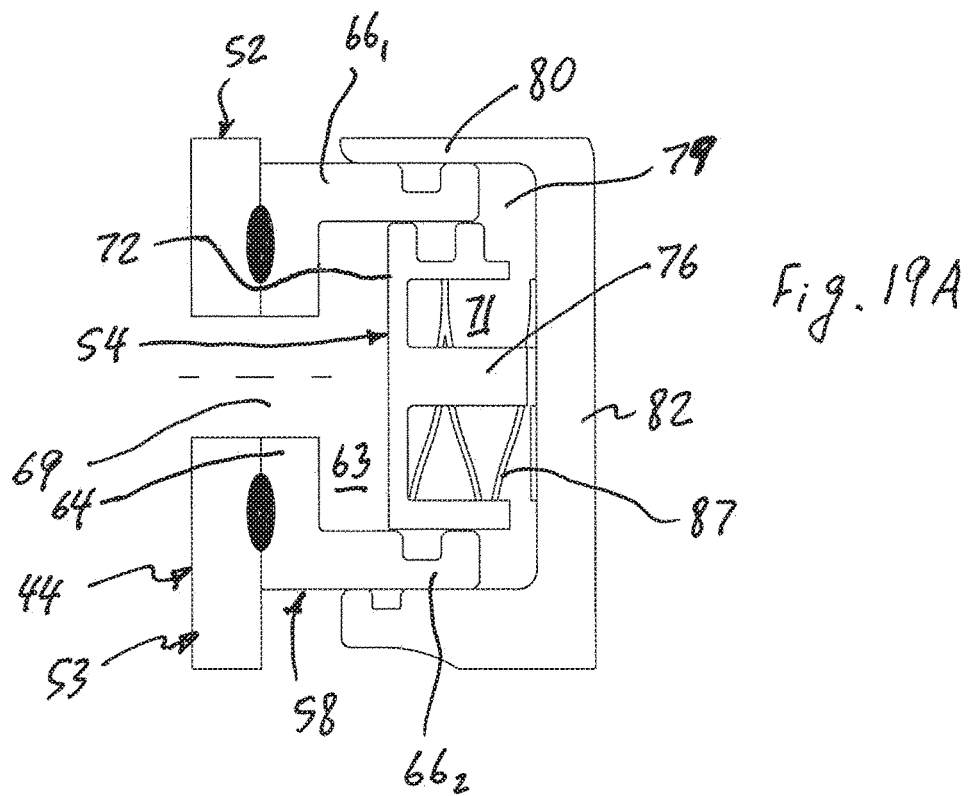
FIG. 19A is an enlarged view of a fragment of the hydrokinetic torque-coupling device shown in the rectangle "19A" of FIG. 18A.
Figure 19B:
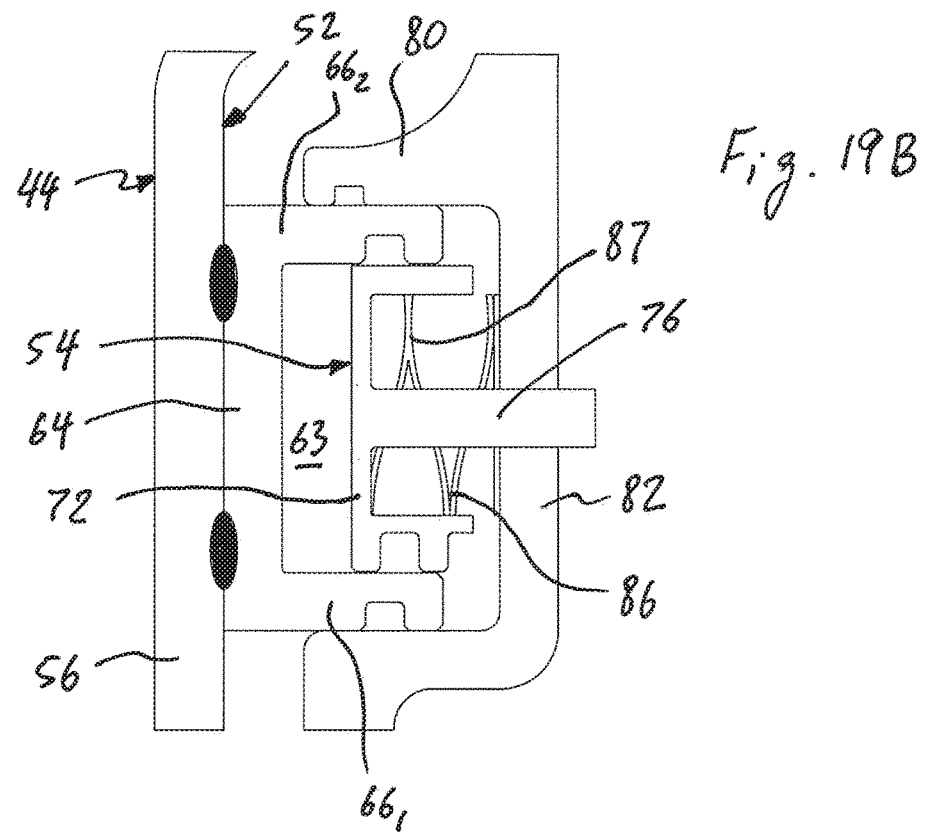
FIG. 19B is an enlarged view of a fragment of the hydrokinetic torque-coupling device shown in the rectangle "19B" of FIG. 18A.

In a fourth mode of operation, illustrated in FIGS. 18A-19C, the release pressure of the lock-up clutch 16 in the release chamber $C_R$ is about 800 KPa, and the apply pressure of the lock-up clutch 16 in the apply chamber $C_A$ is also about 800 KPa. Consequently, the secondary piston 54 remains in the retracted position and maintains the selective clutch 18 in the disengaged position. However, the main piston 52 moves leftward (as illustrated in FIGS. 18A, 18B and 19C) away from the locking surface 12e of the cover shell 20 of the casing 12 to the non-lockup position of the lock-up clutch 16. In the fourth mode of operation, the ICE 4 is on and ready to switch to the first mode of operation.

In a hydrokinetic torque-coupling device 110 of a second exemplary embodiment illustrated in FIGS. 20 and 21, the lock-up clutch 16 is replaced by a lock-up clutch 116. Moreover, the hydrokinetic torque-coupling device 110 of the second exemplary embodiment further includes a vibration damper 118. The hydrokinetic torque-coupling device 110 of FIGS. 20 and 21 corresponds substantially to the hydrokinetic torque-coupling device 10 of FIGS. 2A-19C, and portions, which differ, will therefore be explained in detail below.

The hydrokinetic torque-coupling device 110 includes a sealed hollow casing 12 forming a cavity filled with a hydraulic fluid, such as oil or transmission fluid, and rotatable about a rotational axis X, a hydrokinetic torque converter 14, a lock-up clutch 116, a vibration damper 118, and a selective clutch 18. Hereinafter the axial and radial orientations are considered with respect to the rotational axis X of the torque-coupling device 110. According to the second exemplary embodiment of the present invention, the vibration damper 118 is a conventional torsional vibration damper. Alternatively, any other type of a vibration damper may be used, such as a dynamic damper, a pendulum damper, a blade damper, and combination thereof disposed inside or outside of the casing 12 of the hydrokinetic torque-coupling device 110. As best shown in FIGS. 20 and 21, the lock-up clutch 116 and the torsional vibration damper 118 are disposed in the casing 12, while the selective clutch 18 is disposed outside of the casing 12.

The lock-up clutch 116 of the torque-coupling device 110 is located between the torsional vibration damper 18 and the cover shell 20. The lock-up clutch 116 is switchable between a hydrodynamic transmission mode, in which the turbine wheel 26 is rotatable relative to the casing 12, and a lockup mode, in which the turbine wheel 26 is drivingly coupled to the casing 12. The lock-up clutch 116 of the torque-coupling device 110 includes a dual piston assembly 144 axially movable to and from cover shell 20.

As best shown in FIG. 21, the dual piston assembly 144 includes an annular main (or first) piston 152 axially movable to and from the cover shell 20, and an annular secondary (or second) piston 54 mounted to the main piston 152 coaxially therewith and axially moveable relative to the main piston 152. Moreover, the main piston 152 is rotatable relative to the secondary piston 54 and the cover shell 20. The main piston 152 of the dual piston assembly 144 is disposed axially between the turbine wheel 26 and the locking surface 12e of the cover shell 20.

The main piston 152 comprises an annular main piston body 153, and an annular actuator casing 58 coaxially fixedly attached to the annular main piston body 153. The annular actuator casing 58 is coaxially fixedly attached to the annular main piston body 153 by appropriate means, such as by spot welding. The main piston body 153 includes a radially oriented annular main piston plate 156 coaxial with the rotational axis X, and an annular hub portion 160 having a cylindrical flange 162 that is proximate the rotational axis X relative to the annular main piston plate 156 of the main piston body 153. The cylindrical flange 162 of the hub portion 160 of the main piston body 153 extends axially at a radially inner peripheral end of the hub portion 160 away from the turbine wheel 26. Moreover, the main piston 152 is provided with at least one piston communication hole 157 axially extending through the annular main piston plate 156 of the main piston body 153. According to the second exemplary embodiment of the present invention, the main piston 152 includes a plurality of piston communication holes 157 axially extending through the annular main piston plate 156 of the main piston body 153 and spaced circumferentially equidistantly (or equiangularly) from one another around the rotational axis X. The piston communication holes 157 through the main piston body 153 and the actuator communication holes 65 through the annular plate 64 of the actuator casing 58 form axial communication channels 169 through the main piston 52 that provide axial fluid communication between the apply chamber $C_A$ and the secondary piston cavity 63 of the actuator casing 58 of the main piston 152.

The annular main piston plate 156 of the main piston body 153 has a friction face 156e (defining an engagement surface of the annular main piston plate 156) facing the locking surface 12e of the cover shell 20 of the casing 12, as best shown in FIG. 21. An annular friction liner 149 is fixed to the friction face 156e of the annular main piston plate 156 of the main piston body 153, such as by adhesive bonding, as best shown in FIG. 21. The annular main piston plate 156 of the main piston body 153 is axially movable along the rotational axis X to and from the locking surface 12e defined on the cover shell 20 of the casing 12, as best shown in FIGS. 20 and 21.

The turbine wheel 26 is non-rotatably secured to the turbine hub 40 by appropriate means, such as by rivets, threaded fasteners or welding. The turbine hub 40 is non-rotatably connected to the driven shaft 8, such as through splines. The turbine hub 40 is rotatable about the rotational axis X and is coaxial with the driven shaft 8 so as to center the turbine wheel 26 on the driven shaft 8. An annular sealing member 43, mounted to a radially inner peripheral surface of the output hub 40, creates a seal at the interface of the transmission input shaft 8 and the output hub 40. The main piston 152 is mounted to the output hub 40 so that the cylindrical flange 162 of the hub portion 160 of the main piston body 153 slidably engages a cylindrical, radially outer peripheral surface of the output hub 40. As a result, the main piston 152 is axially moveable and rotatable relative to the output hub 40.

The main piston 152 is axially moveable relative to the cover shell 20 between a lockup position and a non-lockup position of the lockup clutch 116. In the lockup position of the lockup clutch 116, the annular friction liner 149 fixed to the friction face 156e of the annular main piston plate 156 of the main piston 152 non-rotatably frictionally engages the locking surface 12e of the cover shell 20 of the casing 12.

In the non-lockup position of the lockup clutch 16, as best shown in FIGS. 20 and 21, the annular friction liner 149 of the annular main piston plate 156 of the main piston 152 is axially spaced (i.e., frictionally disengaged) from the locking surface 12e of the cover shell 20 of the casing 12 and does not frictionally engage the cover shell 20 of the casing 12. In the lockup position of the lockup clutch 116, the main piston 152 is frictionally non-rotatably coupled to the casing 12 so as to drivingly couple the casing 12 to the turbine hub 40 through the turbine shell 34. In the non-lockup position of the lockup clutch 116, as best shown in FIGS. 20 and 21, the casing 12 is rotatably and drivingly coupled to the turbine hub 40 through the turbine wheel 26 of the torque converter 14. Moreover, a thrust bearing 51 is interposed between the turbine hub 40 and the hub portion 160 of the main piston body 153. The thrust bearing 51 limits axial movement of the main piston 152 in the direction away from the locking surface 12e of the cover shell 20, i.e., toward the non-lockup position of the lockup clutch 116, as best shown in FIG. 21.

The torsional vibration damper 118 includes an input (or drive) member defined by the main piston plate 156 of the main piston body 153 of the main piston 152, a plurality of circumferentially acting elastic members (springs) 139, and an output (or driven) member 137 elastically coupled to the main piston 152 through the elastic members 139. The driven member 137 of the torsional vibration damper 118 is non-moveably connected to the turbine shell 34 of the turbine wheel 26 by appropriate means, such as by rivets or welding. The elastic members 139 are disposed in series relative to each other between a radially outer end 159 of the drive member 156 and the driven member 137, as best shown in FIG. 21. According to the second exemplary embodiment as applied to FIG. 1, the elastic members 139 are configured as helical (or coil) springs having a principal axis oriented substantially circumferentially. Other elastic members may be selected to replace or supplement the springs 139. The drive member 156 and the driven members 137 engage circumferentially opposite ends of the elastic members 139. Moreover, as the main piston 152 is axially moveable relative to the turbine hub 40 along the rotational axis X, the radially outer end 159 of the main piston plate 156 of the main piston 152 with the elastic members 139 is axially moveable relative to the driven members 137 of the torsional vibration damper 118, i.e., relative to the turbine wheel 26, as is well known in the art. Alternatively, the elastic members 139 may be axially moveable relative to the main piston plate 156 of the main piston 152. Accordingly, the main piston plate 156 of the main piston body 153 is elastically coupled to the turbine wheel 26 through the elastic members 139, as is well known in the art. In other words, the main piston plate 156 of the main piston body 153 is rotatable (or pivotable) relative to the turbine shell 34 of the turbine wheel 26 due to elasticity of the elastic members 139, which absorb torsional vibration.

The hydrokinetic torque-coupling device 110 of the second exemplary embodiment functions generally the same way as the hydrokinetic torque-coupling device 10 of the first exemplary embodiment. Specifically, the hydrokinetic torque-coupling device 110 in accordance with the second exemplary embodiment of the present invention also has four modes of operation.

In a first mode of operation, illustrated in FIGS. 20 and 21, the release pressure of the lock-up clutch 16 in the release chamber $C_R$ is about 500 KPa, while the apply pressure of the lock-up clutch 16 in the apply chamber $C_A$ is about 200 KPa. Consequently, due to pressure differential, the main piston 152 is in the non-lockup position and the secondary piston 54 is in the extended position, in which both the main piston 152 and the secondary piston 54 are spaced from the cover shell 20 a maximum distance. In that event the main piston 152 does not frictionally engage the locking surface 12e of the cover shell 20 of the casing 12 (i.e., the non-lockup position of the lock-up clutch 116), and the output member 93 of the selective clutch 18 is in the engaged position. In the first mode of operation, the annular friction liner 149 of the annular main piston plate 156 of the main piston 152 is axially spaced from the locking surface 12e of the cover shell 20, and the torque-coupling device 110 is in a hydrodynamic mode with the ICE 4 drivingly coupled thereto.

In a second mode of operation, the apply pressure of the lock-up clutch 16 in the apply chamber $C_A$ is between 0-500 KPa, preferably between 100-500 KPa. Consequently, the main piston 152 is moved rightward toward the cover shell 20 to the lockup position. In that event, the friction liner 149 of the annular main piston plate 156 of the main piston 152 presses against the locking surface 12e of the cover shell 20 to frictionally non-rotatably engage the main piston 152 against the casing 12 (i.e., the lockup position of the lock-up clutch 116). The secondary piston 54 remains in the extended position, in which the output member 93 of the selective clutch 18 is in the engaged position. In the second mode of operation, the ICE 4 and the transmission shaft 8 are directly connected. In the second mode of operation a battery of the hybrid vehicle may be in charging mode.

In a third mode of operation, the apply pressure of the lock-up clutch 116 in the apply chamber $C_A$ is between 500-800 KPa. Consequently, the secondary piston 54 moves rightward in the direction toward the cover shell 20 of the casing 12 and the selective clutch 18 to the retracted position to place the selective clutch 18 in the disengaged position. Specifically, the free distal ends 77 of the actuator tabs 76 push the friction disc 94 of the output member 93 away from the friction surface 92e of the friction plate 92 of the clutch casing 91 against the resilient force of the spring member 97, and place the selective clutch 18 in the disengaged position. The main piston 152 remains in the lockup position. In the third mode of operation, the ICE 4 and transmission shaft 8 are disconnected, while the electric machine 6 and the transmission shaft 8 are directly connected. The ICE 4 may be off. The hybrid vehicle is in re-generation mode or an electric-drive (or E-drive) mode.

In a fourth mode of operation, the release pressure of the lock-up clutch 116 in the release chamber $C_R$ is about 800 KPa, and the apply pressure of the lock-up clutch 116 in the apply chamber $C_A$ is also about 800 KPa. Consequently, the secondary piston 54 remains in the retracted position and maintains the selective clutch 18 in the disengaged position. However, the main piston 152 moves leftward away from the locking surface 12e of the cover shell 20 of the casing 12 to the non-lockup position of the lock-up clutch 116. In the fourth mode of operation, the ICE 4 is on and ready to switch to the first mode of operation.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for a hybrid electric vehicle, comprising:
    a casing rotatable about a rotational axis and forming a cavity for hydraulic fluid;
    a torque converter including an impeller wheel and a turbine wheel disposed in the casing coaxially with the impeller wheel;
    a lockup clutch including a dual piston assembly and being switchable between a hydrodynamic transmission mode and a lockup mode; and
    a selective clutch disposed outside of the casing, the selective clutch including an input member rotatable relative to the casing and an output member non-rotatably mounted to the casing;
    the dual piston assembly including a main piston axially moveable relative to the casing and a secondary piston adjacent to the main piston and axially moveable relative to the main piston and the casing, both the main piston and the secondary piston of the dual piston assembly being coaxial with the rotational axis;
    the main piston comprising a main piston body and an actuator casing non-movable relative to the to the main piston body, both the main piston body and the actuator casing being coaxial with the rotational axis;
    the actuator casing forming a secondary piston cylinder coaxial with the rotational axis and configured to reciprocatingly receive the secondary piston therewithin;
    the main piston having at least one axial communication channel fluidly connecting the secondary piston cylinder of the actuator casing of the main piston with the cavity within the casing;
    the main piston of the dual piston assembly selectively axially moveable relative to the casing and the secondary piston between a lockup position and a non-lockup position;
    the output member of the selective clutch selectively axially moveable relative to the input member between an engaged position, in which the output member is non-rotatably coupled to the input member of the selective clutch, and a disengaged position, in which the output member is rotatable relative to the input member of the selective clutch;
    the output member of the selective clutch is selectively axially moveable from the engaged position to the disengaged position of the selective clutch by action of the secondary piston.

2. The hydrokinetic torque-coupling device as defined in claim 1, wherein the main piston includes at least one radial communication channel extending radially through the main piston between the main piston body and the actuator casing.

3. The hydrokinetic torque-coupling device as defined in claim 1, wherein the casing includes a cover shell and an impeller shell disposed coaxially with and axially opposite to the cover shell, and wherein the cover shell and the impeller shell are non-movably connected to one another.

4. The hydrokinetic torque-coupling device as defined in claim 3, further comprising a turbine hub coaxial with the rotational axis and non-moveably secured to the turbine wheel.

5. The hydrokinetic torque-coupling device as defined in claim 4, wherein the main piston body includes a radially oriented annular piston plate and an annular hub portion axially moveable relative to the turbine hub.

6. The hydrokinetic torque-coupling device as defined in claim 5, wherein the main piston is non-rotatably mounted to the turbine hub.

7. The hydrokinetic torque-coupling device as defined in claim 5, wherein the main piston is rotatably mounted to the turbine hub.

8. The hydrokinetic torque-coupling device as defined in claim 5, wherein the secondary piston includes an annular head member, outer and inner cylindrical skirts defining a hollow chamber within the secondary piston, and at least one actuator tab axially extending from the head member through the cover shell of the casing so as to engage the output member of the selective clutch.

9. The hydrokinetic torque coupling device as defined in claim 8, wherein the at least one actuator tab includes a plurality of actuator tabs spaced circumferentially equidistantly from one another around the rotational axis, and wherein each of the actuator tabs is configured to engage the output member of the selective clutch.

10. The hydrokinetic torque-coupling device as defined in claim 5, wherein the dual piston assembly includes outer and inner annular secondary piston sealing members between the actuator casing and the outer and inner cylindrical skirts of the secondary piston.

11. The hydrokinetic torque-coupling device as defined in claim 3, wherein the secondary piston is axially biased toward the main piston body and away from the cover shell of the casing by at least one compression spring.

12. The hydrokinetic torque-coupling device as defined claim 3, wherein the cover shell of the casing includes an annular piston cup coaxial with the rotational axis X and formed integrally with the cover shell of the casing, wherein the piston cup receives the actuator casing so that main piston is axially moveable relative the piston cup of cover shell, and wherein the secondary piston is axially moveable relative both the main piston and the piston cup of cover shell.

13. The hydrokinetic torque-coupling device as defined in claim 12, further including first and second annular main piston sealing members between the actuator casing and the piston cup of cover shell.

14. The hydrokinetic torque-coupling device as defined in claim 1, wherein the selective clutch further includes a spring member biasing the output member toward the engaged position so that the output member non-rotatably engages the input member of the selective clutch by the spring member.

15. The hydrokinetic torque coupling device as defined in claim 14, wherein the input member of the selective clutch includes a clutch casing having a friction plate forming a friction surface facing the output member of the selective clutch, and wherein the output member of the selective clutch includes a friction disc axially facing the friction surface of the clutch casing.

16. The hydrokinetic torque coupling device as defined in claim 15, wherein the friction disc of the selective clutch is axially biased toward the friction surface the friction plate of the clutch casing of the selective clutch by the spring member so that in the engaged position the friction disc of the output member non-rotatably engages the friction plate of the clutch casing of the selective clutch.

17. The hydrokinetic torque-coupling device as defined in claim 1, further comprising a vibration damper elastically coupling the main piston to the turbine wheel.

18. The hydrokinetic torque-coupling device as defined in claim 17, wherein the vibration damper is a torsional vibration damper including a drive member defined by the main piston body of the main piston, a plurality of circumferentially acting elastic members, and a driven member elastically coupled to the main piston body through the elastic members, and wherein the driven member is non-rotatably secured to the turbine wheel.

19. The hydrokinetic torque-coupling device as defined in claim 18, wherein the elastic members are axially moveable relative to at least one of the driven member and the main piston.

20. A method of operation of a hydrokinetic torque-coupling device for a hybrid electric vehicle comprising an internal combustion engine and an electrical machine, the hydrokinetic torque-coupling device comprising:
a casing rotatable about a rotational axis and forming a cavity for hydraulic fluid;
a torque converter including an impeller wheel and a turbine wheel disposed in the casing coaxially with the impeller wheel;
a lockup clutch including a dual piston assembly and being switchable between a hydrodynamic transmission mode and a lockup mode; and
a selective clutch disposed outside of the casing, the selective clutch including an input member rotatable relative to the casing and an output member non-rotatably mounted to the casing;
the dual piston assembly including a main piston axially moveable relative to the casing and a secondary piston adjacent to the main piston and axially moveable relative to the main piston and the casing, both the main piston and the secondary piston of the dual piston assembly being coaxial with the rotational axis;
the main piston comprising a main piston body and an actuator casing non-movable relative to the to the main piston body, both the main piston body and the actuator casing being coaxial with the rotational axis;
the actuator casing forming a secondary piston cylinder coaxial with the rotational axis and configured to reciprocatingly receive the secondary piston therewithin;
the main piston having at least one axial communication channel fluidly connecting the secondary piston cylinder of the actuator casing of the main piston with the cavity within the casing;
the main piston of the dual piston assembly selectively axially moveable relative to the casing and the secondary piston between a lockup position and a non-lockup position;
the output member of the selective clutch selectively axially moveable relative to the input member thereof between an engaged position, in which the output member is non-rotatably coupled to the input member of the selective clutch, and a disengaged position, in which the output member is rotatable relative to the input member of the selective clutch;
the output member of the selective clutch selectively axially moveable from the engaged position to the disengaged position of the selective clutch by action of the secondary piston;

the method comprising the step of selectively controlling axial displacement of the dual lockup piston assembly by regulating hydraulic pressure to the main piston and the secondary piston in order to configure the output member of the selective clutch in a desired one of the engaged position and the disengaged position.

* * * * *